United States Patent
Naito et al.

(10) Patent No.: US 7,881,583 B2
(45) Date of Patent: Feb. 1, 2011

(54) PLAYBACK APPARATUS, PLAYBACK METHOD, AND PLAYBACK PROGRAM

(75) Inventors: Hitoshi Naito, Kanagawa (JP); Manabu Hatakenaka, Kanagawa (JP)

(73) Assignee: Sony Corporation, Tokyo (JP)

( * ) Notice: Subject to any disclaimer, the term of this patent is extended or adjusted under 35 U.S.C. 154(b) by 1159 days.

(21) Appl. No.: 11/516,201

(22) Filed: Sep. 6, 2006

(65) Prior Publication Data

US 2007/0058928 A1    Mar. 15, 2007

(30) Foreign Application Priority Data

Sep. 8, 2005    (JP) .............................. 2005-260742

(51) Int. Cl.
*H04N 5/91* (2006.01)
*H04N 7/26* (2006.01)

(52) U.S. Cl. .................................. 386/68; 386/109

(58) Field of Classification Search .................. 386/68, 386/67, 124, 125, 46, 92, 6
See application file for complete search history.

(56) References Cited

U.S. PATENT DOCUMENTS

| | | | | |
|---|---|---|---|---|
| 5,140,437 | A | * | 8/1992 | Yonemitsu et al. .......... 386/111 |
| 5,377,051 | A | * | 12/1994 | Lane et al. .................... 386/81 |
| 6,707,778 | B1 | | 3/2004 | Lin et al. |
| 6,778,265 | B1 | | 8/2004 | Lin et al. |
| 6,856,755 | B1 | | 2/2005 | Lin et al. |
| 6,879,770 | B1 | | 4/2005 | Van Asten et al. |

FOREIGN PATENT DOCUMENTS

| | | |
|---|---|---|
| JP | 11 98513 | 4/1999 |
| JP | 2000 41220 | 2/2000 |
| JP | 2000 101969 | 4/2000 |
| JP | 2001 145111 | 5/2001 |
| JP | 2003 101956 | 4/2003 |
| JP | 2003 101967 | 4/2003 |
| JP | 2003 101968 | 4/2003 |
| WO | WO 03 046892 | 6/2003 |

* cited by examiner

*Primary Examiner*—Robert Chevalier
(74) *Attorney, Agent, or Firm*—Frommer Lawrence & Haug LLP; William S. Frommer

(57) ABSTRACT

A playback apparatus is capable of playing back video data at a variable speed ranging from a forward normal speed to a reverse normal speed, the video data having been encoded for compression through inter-frame compression based on predictive coding and recorded on a recording medium that allows random access. The playback apparatus includes a frame buffer configured to temporarily store video data of a plurality of frames; a target-pattern generator configured to generate a target pattern of the frame buffer for a target playback frame to be played back next; a comparator configured to compare a current state of the frame buffer with the target pattern; and a frame-buffer controller configured to extract a frame to be newly decoded and a frame no longer used in the current state of the frame buffer, on the basis of a result of the comparison by the comparator.

7 Claims, 15 Drawing Sheets

PLAYBACK APPARATUS, PLAYBACK METHOD, AND PLAYBACK PROGRAM

CROSS REFERENCES TO RELATED APPLICATIONS

The present invention contains subject matter related to Japanese Patent Application JP 2005-260742 filed in the Japanese Patent Office on Sep. 8, 2005, the entire contents of which are incorporated herein by reference.

BACKGROUND OF THE INVENTION

1. Field of the Invention

The present invention relates to a playback apparatus, playback method, and playback program that allow playback of pictures with an improved picture quality at a variable playback speed in the forward direction or reverse direction.

2. Description of the Related Art

Data recording and playback apparatuses for recording or playing back digital video signals and digital audio signals onto or from a recording medium exist. As a recording medium for recording digital video signals and digital audio signals, a serial-access recording medium, such as a magnetic tape, has often been used hitherto. Recently, a random access medium, such as an optical disc, a hard disc, or a semiconductor memory, are coming to be used more often for recording and playback of digital audio signals.

Because of their large data volume, digital video signals are usually encoded for compression according to a predetermined scheme before being recorded on a recording medium. Recently, MPEG2 (Moving Picture Experts Group 2) is used as a standard scheme of encoding for compression. According to MPEG2, digital video signals are encoded for compression through DCT (discrete cosine transform) and motion compensation, and the rate of data compression is enhanced using variable-length codes.

Now, an overview of the structure of an MPEG2 data stream will be described. MPEG2 is based on a combination of predictive coding with motion compensation and encoding for compression by DCT. The data structure according to MPEG2 forms a hierarchy including a block layer, a macro-block layer, a slice layer, a picture layer, a GOP layer, and a sequence layer, in that order from the bottom. The block layer is composed of a DCT block as a unit of executing DCT. The macro-block layer is composed of a plurality of DCT blocks. The slice layer is composed of a header and one or more macro blocks. The picture layer is composed of a header and one or more slices. A picture corresponds to one screen.

The GOP layer is composed of a header, an intra-coded picture (I picture), which is a picture based on intra-frame coding, and a predictive coded picture (P picture) and a bi-directionally predictive coded picture (B picture), which are pictures based on predictive coding. The I picture can be decoded with its own information alone. The P and B pictures are not decoded alone, and a preceding picture or preceding and succeeding pictures is used as a reference picture for decoding. For example, the P picture is decoded using a temporally preceding I picture or P picture as a reference picture. The B picture is decoded using two preceding and succeeding I or P pictures as reference pictures. A group that includes at least one I picture and that does not depend on any picture outside the group is referred to as a GOP (group of pictures), which constitutes a minimum unit of independent access in an MPEG stream.

A GOP is composed of one or more pictures. In the following description, a GOP composed of only one I picture is referred to as a single GOP, and a GOP composed of a plurality of pictures including an I picture and P and/or B pictures is referred to as a long GOP. In the case of a single GOP, the GOP is composed of only one I picture, so that editing on a frame-by-frame basis is facilitated. Furthermore, since inter-frame predictive coding is not executed, an improved picture quality can be achieved. In contrast, in the case of a long GOP, inter-frame predictive coding is executed, so that the efficiency of compression is high.

Long GOPs can be classified into two types, namely, a closed GOP having a closed structure so that complete decoding is allowed within the GOP, and an open GOP in which information of an immediately preceding GOP in order of encoding can be used at the time of decoding. As compared with closed GOPs, open GOPs can be decoded using more information to achieve, so that high picture quality can be achieved, and are commonly used. Hereinafter, a "GOP" refers to an open GOP unless otherwise described.

The SD (standard definition) format at a bitrate of 25 Mbps (megabits per second) has been known as a format of video signals. Particularly, in video apparatuses used in broadcasting stations or the like, video signals in the SD format are used in single GOPs described above so that high picture quality and an environment that allows precise editing can be achieved. The video signals in the SD format have a fixed bitrate, i.e., the bitrates of individual frames are the same.

Recently, as technologies such as digital high-definition broadcasting come into practice, the HD (high definition) format having a resolution higher than the resolution of the SD format is coming to be used. The HD format has a higher bitrate in accordance with the high resolution, so that recording for a long period on a recording is not allowed in the case of single GOPs. Thus, video signals in the HD format are used in long GOPs described above. In the case of long GOPs, since inter-frame compression based on predictive coding is executed, the bitrate is variable, i.e., the bitrates vary among individual frames.

When video signals are edited, in order to define editing points, such as IN points and OUT points, searching of individual frames is executed. For this purpose, variable-speed playback within a normal speed in the forward direction and the reverse direction should be allowed. When single GOPs are used as in the case of the SD format, it is possible to decode individual frames individually, so that problems does not particularly arise regarding the variable-speed playback within the normal speed. That is, in the case of single GOPs, it suffices to decode at least frames that are to be displayed.

On the other hand, when long GOPs are used as in the case of the HD format, in contrast to the case of the SD format described above, it is not possible to decode individual frames independently. Now, decoding in the case of a long GOP will be described with reference to FIGS. 16A to 16C. It is assumed herein that a GOP is composed of 15 pictures in total, namely, one I picture, four P pictures, and ten B pictures. The order of display of the I, P, and B pictures in the GOP is, for example, "$B_0B_1I_2B_3B_4P_5B_6B_7P_8B_9B_{10}P_{11}B_{12}B_{13}P_{14}$", as shown in FIG. 16A. The indices represent orders of display.

In this example, the first two $B_0$ picture and $B_1$ pictures are pictures predicted and decoding using the last $P_{14}$ picture in the immediately preceding GOP and the $I_2$ picture in the current GOP. The first $P_5$ picture in the current GOP is a picture predicted and decoded using the $I_2$ picture. The other $P_8$ picture, $P_{11}$ picture, and $P_{14}$ pictures are pictures predicted and decoded using their respective immediately preceding P pictures. Each of the B pictures subsequent to the I picture is a picture predicted and decoding using preceding and succeeding I and/or P pictures.

Since B pictures are predicted and decoded using temporally preceding and succeeding I or P pictures, the order of I, P, and B pictures in a stream or on a recording medium should be determined in consideration of an order of decoding by a decoder. That is, the order should be such that I and/or P pictures for decoding a B picture are decoded before the B picture.

In the example described above, the order of pictures in a stream or a on a recording medium is "$I_2 B_0 B_1 P_5 B_3 B_4 P_8 B_6 B_7 P_{11} B_9 B_{10} P_{14} B_{12} B_{13}$", as in an example shown in FIG. 16B, and the pictures are input to a decoder in this order. The indices represent orders of display, correspondingly to those in FIG. 16A.

In the decoding by the decoder, as shown in FIG. 16C, the $I_2$ picture is first decoded. Then, the $B_0$ picture and the $B_1$ picture are predicted and decoded using the decoded $I_2$ picture and the last $P_{14}$ picture (in order of display) in the immediately preceding GOP. The $B_0$ picture and the $B_1$ picture are output from the decoder sequentially in order of decoding, and then the $I_2$ picture is output. When the $B_1$ picture has been output, then, the $P_5$ picture is predicted and decoded using the $I_2$ picture. Then, the $B_3$ picture and the $B_4$ picture are predicted and decoded using the $I_2$ picture and the $P_5$ picture. Then, the $B_3$ picture and the $B_4$ picture are output from the decoder sequentially in order of decoding, and then the $P_5$ picture is output.

Subsequently, P or I pictures used for predicting a B picture are decoded before decoding the B picture, the B picture is predicted and decoded using the decoded P or I pictures, the decoded B picture is output, and then, the P or I pictures used for decoding the B picture are output. This processing is repeated. The arrangement of pictures on a recording medium or in a stream, shown in FIG. 16B, is often used, in which a frame memory having a size corresponding to four frames is used for decoding.

Normal-speed playback in the forward direction using a long GOP for video signals can be achieved using a decoder (normal-speed decoder) that is capable of obtaining results of decoding of a picture of one frame in a time corresponding to one frame.

SUMMARY OF THE INVENTION

It is desired, particularly in editing operations or the like, that it is possible to vary the playback speed within the normal speed and to flexibly switch the playback direction between the forward direction and the reverse direction. Now, a case where a long GOP is used for video signals and variable-speed playback is executed at a playback speed within the normal speed in the forward direction and the reverse direction will be considered.

When a single GOP is used for video signals, as described earlier, it is possible to independently decode frames that are to be displayed. Thus, problems do not particularly arise even when variable-speed playback within the normal speed in the forward direction and the reverse direction or switching of the playback direction between the forward direction and the reverse direction is executed.

When a long GOP is used for video signals, as described earlier, one or more temporally preceding and/or succeeding pictures are used to decode a frame that is to be displayed. Playback at a playback speed within the normal speed in the forward direction can be achieved using the normal-speed decoder mentioned above, by stopping the input speed in accordance with the playback speed to refrain from updating a frame memory and by repeatedly reading output video signals from the frame memory.

When a long GOP is used for video signals and playback in the reverse direction is executed, a large number of picture is often used to display a picture of one frame compared with a case of playback in the forward direction.

For example, when the video stream having a display order shown in FIG. 16A is played back in the reverse direction, the $P_{14}$ picture is to be output first. As described earlier, in order to decode the $P_{14}$ picture, the $I_2$ picture, $P_5$ picture, $P_8$ picture, and $P_{11}$ picture should be decoded. Thus, when a stream is input in an order shown in FIG. 16B, a delay corresponding to decoding of at least four frames occurs. Furthermore, since the $I_2$ picture, $P_5$ picture, $P_8$ picture, and $P_{11}$ picture are used for decoding a B picture, these pictures are stored in a memory.

Furthermore, the $B_1$ picture and $B_0$ picture, which are to be output at the end of the GOP, are predicted and decoded using the $I_2$ picture in the current GOP and the $P_{14}$ picture in the immediately preceding GOP in the ordinary playback direction, i.e., the immediately succeeding GOP in the case of playback in the reverse direction. Thus, during decoding of the current GOP, the immediately succeeding GOP in order of display in the reverse direction playback should be decoded.

Now, switching of the playback direction from the forward direction to the reverse direction or the reverse direction to the forward direction will be considered. This corresponds to a case where, for example, assuming an editing apparatus or the like in which the playback speed and playback direction can be controlled using a jog dial or the like, desired frames are searched for while switching the playback speed and playback direction with reference to a point corresponding to a playback speed of 0.

For example, when an arbitrary frame is displayed during playback in the forward direction and the playback direction is switched to the reverse direction, if the frame picture of a frame immediately preceding the frame immediately before the switching of the playback direction from the forward direction to the reverse direction is remaining in a frame memory, the first frame after the switching of the playback direction to the reverse direction an be displayed using the frame picture remaining in the frame memory.

However, for example, when the frame immediately before the switching of the playback direction to the reverse direction is the $P_{14}$ picture, which is displayed at the end of the GOP, the frame that is to be displayed immediately after the switching of the playback direction to the reverse direction is the $B_{13}$ picture of the GOP. In order to decode the $B_{13}$ picture, the $P_{14}$ picture and $P_{11}$ picture are used. Furthermore, in order to decode the $P_{11}$ picture, the $I_2$ picture, $P_5$ picture, and $P_8$ picture in the GOP are used.

Thus, in this case, at the time of switching of the playback direction from the forward direction to the reverse direction, a delay corresponding to a decoding time for at least four pictures ($I_2$ picture, $P_5$ picture, $P_8$ picture, and $P_{11}$ picture) occurs. Particularly, when the switching between the forward direction and the reverse direction occurs frequently, this delay results in a sense of laboriousness of operations.

That is, in order to use a recording and playback operation for an editing operation or the like, in relation to a command speed requested by an upper-layer system, such as an editing apparatus, the result of playback should be output with a constant delay. If a delay occurs at the time of switching of the playback direction from the forward direction to the reverse direction, application to an editing operation is not suitable.

In order to overcome this problem, some approaches have been proposed. According to a first approach, a decoder with a decoding speed sufficiently faster than the normal speed is used. When the first approach is applied to the example described above, for example, a decoder that is capable of decoding pictures of four or more frames in one frame period is used. However, a decoder with a high decoding speed is expensive compared with a normal-speed decoder, so that cost increases.

According to a second approach, pictures that are not decoded in time for certain display timing are dropped, i.e., such pictures are not decoded or displayed, so that playback is apparently continued. However, this approach results in a problem of display quality.

According to a third approach, at the time of encoding, data that can be played back and output with a constant delay, such as low-resolution data having a reduced resolution compared with original video signals, is created and recorded on a recording medium. At the time of playback, when the original video signals are not decoded in tie, the low-resolution data is used for display. However, according to this approach, low-resolution pictures are mixed with pictures of original video signals in display, so that a problem of display quality arises.

According to a fourth approach, pictures that are used are decoded after a command speed requested by an upper-layer system is determined, and playback is actually started when an amount of pictures sufficient for smooth playback have been stored in a frame memory. However, according to this approach, a delay occurs from the request of a command speed by an upper-layer system to the start of playback. Thus, the problem described above is not solved.

It is desired that a playback apparatus, playback method, and playback program be provided that allow variable-speed playback in a range of normal-speed playback in the forward direction to normal-speed playback in the reverse direction with a constant delay when video signals that have been inter-frame compressed through predictive coding are played back using a normal-speed decoder.

According to an embodiment of the present invention, there is provided a playback apparatus that is capable of playing back video data at a variable speed ranging from a normal speed in a reverse direction to a normal speed in a forward direction, the video data having been encoded for compression through inter-frame compression based on predictive coding and recorded on a recording medium that allows random access. The playback apparatus includes a frame buffer configured to temporarily store video data of a plurality of frames; a target-pattern generator configured to generate a target pattern of the frame buffer for a target playback frame that is to be played back next; a comparator configured to compare a current state of the frame buffer with the target pattern; and a frame-buffer controller configured to extract a frame that is to be newly decoded and to extract a frame that is no longer used in the current state of the frame buffer, on the basis of a result of the comparison by the comparator.

According to another embodiment of the present invention, there is provided a playback method for playing back video data at a variable speed ranging from a normal speed in a reverse direction to a normal speed in a forward direction, the video data having been encoded for compression through inter-frame compression based on predictive coding and recorded on a recording medium that allows random access. The playback method includes the steps of generating a target pattern of a frame buffer that is capable of temporarily storing video data of a plurality of frames, the target pattern being associated with a target playback frame that is to be played back next; comparing a current state of the frame buffer with the target pattern; and extracting a frame that is to be newly decoded and extracting a frame that is no longer used in the current state of the frame buffer, on the basis of a result of the comparison.

According to another embodiment of the present invention, there is provided a playback program for allowing a computer to execute a playback method for playing back video data at a variable speed ranging from a normal speed in a reverse direction to a normal speed in a forward direction, the video data having been encoded for compression through inter-frame compression based on predictive coding and recorded on a recording medium that allows random access. The playback method comprising the steps of generating a target pattern of a frame buffer that is capable of temporarily storing video data of a plurality of frames, the target pattern being associated with a target playback frame that is to be played back next; comparing a current state of the frame buffer with the target pattern; and extracting a frame that is to be newly decoded and extracting a frame that is no longer used in the current state of the frame buffer, on the basis of a result of the comparison.

As described above, according to these embodiments of the present invention, a target pattern of a frame buffer that is capable of temporarily storing video data of a plurality of frames is generated, the target pattern being associated with a target playback frame that is to be played back next; a current state of the frame buffer is compared with the target pattern; and a frame that is to be newly decoded and a frame that is no longer used in the current state of the frame buffer are extracted on the basis of a result of the comparison. Thus, during playback in a range of normal-speed playback in the forward direction to normal-speed playback in the reverse direction, the number of frames that is to be updated in the frame buffer is constantly one. Furthermore, the delay from input of a frame to decoding is constant. Accordingly, variable-speed playback in a range of normal-speed playback in the forward direction to normal-speed playback in the reverse direction can be achieved using a normal-speed decoder with a constant delay and without dropping frames.

According to these embodiments of the present invention, a target pattern of a frame buffer for a target playback frame that is to be played back next is generated; a current state of the frame buffer is compared with the target pattern; and a frame that is to be newly decoded and a frame that is no longer used in the current state of the frame buffer are extracted on the basis of a result of the comparison. Thus, during playback in a range of normal-speed playback in the forward direction to normal-speed playback in the reverse direction, the number of frames that is to be updated in the frame buffer is constantly one. Furthermore, the delay from input of a frame to decoding is constant.

Accordingly, variable-speed playback in a range of normal-speed playback in the forward direction to normal-speed playback in the reverse direction can be achieved using a normal-speed decoder with a constant delay and without dropping frames.

DESCRIPTION OF THE PREFERRED EMBODIMENTS

Figure 1:
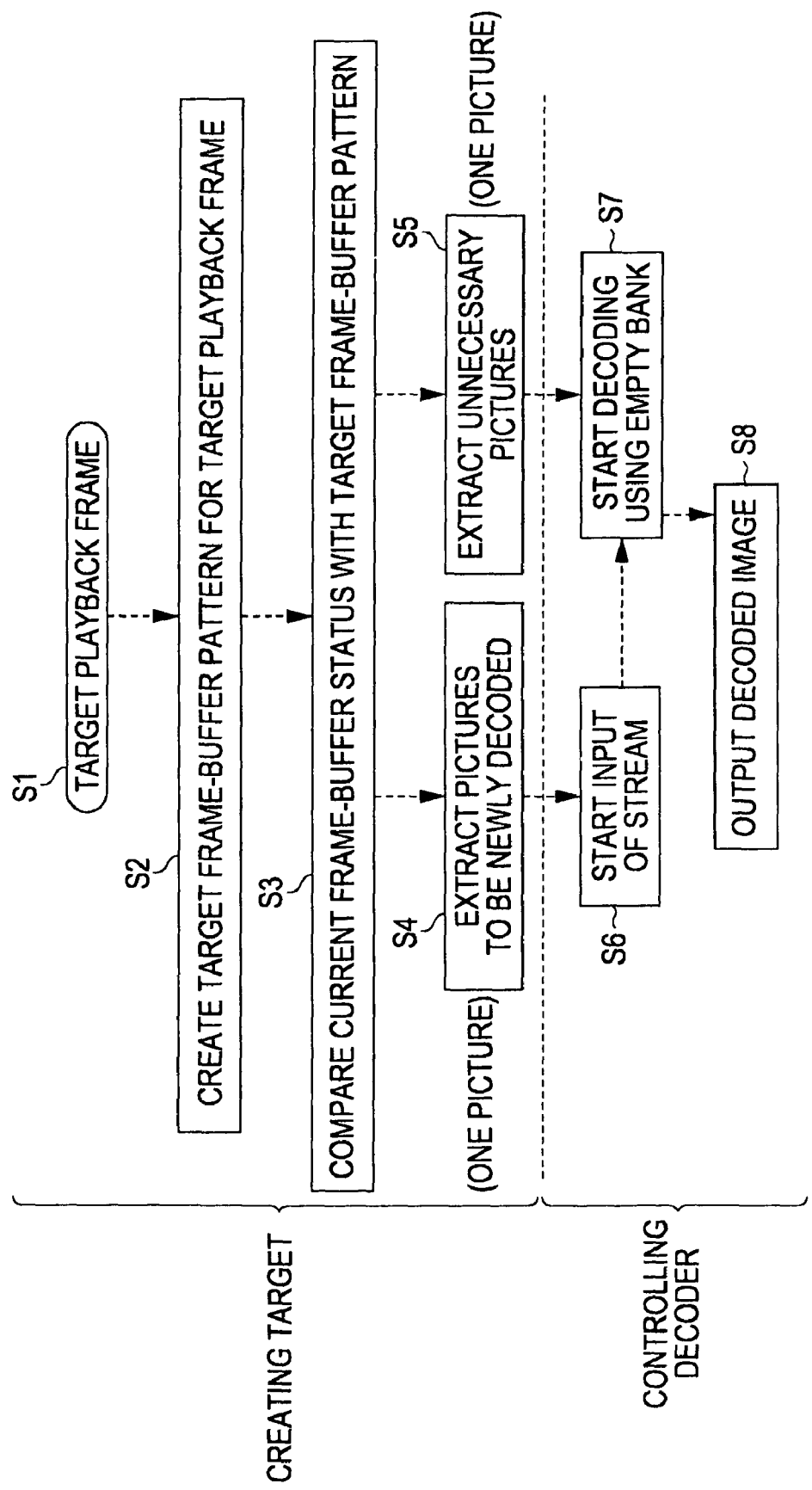
FIG. 1 is a diagram schematically showing a playback controlling process according to an embodiment of the present invention.

Now, an embodiment of the present invention will be described with reference to the drawings. FIG. 1 schematically shows a playback controlling process according to an embodiment of the present invention. In step S1, a target playback frame that is to be played back next is specified. For example, when the playback speed is within a normal speed in the forward direction or the reverse direction, the target playback frame is in a range of frames that are adjacent in order of display to a target playback frame determined at a timing preceding by one frame. The target playback frame is specified, for example, by an upper-layer system, and is supplied at each timing of a frame.

After the target playback frame is specified, in step S2, a target frame-buffer pattern for the target playback frame is generated. The target frame-buffer pattern is a pattern of frames that are to be stored in decoded forms in a frame buffer in order to play back the target playback frame and to continue playback in the reverse direction or the forward direction. Then, in step S3, the target frame-buffer pattern that has been generated is compared with the current state of the frame buffer. On the basis of the comparison, a picture that is to be newly decoded in view of the current state of the frame buffer is extracted in step S4, and a picture that is no longer used in the current state of the frame buffer is extracted in step S5. In each of steps S4 and S5, one picture is extracted.

Through the processing described above, a target for actually executing decoding is generated. After the processing, a decoder is actually controlled to start decoding.

In step S6, for example, a recording medium is accessed to input a picture stream based on the result of extraction in step S4 to the decoder. In step S7, the picture decoded by the decoder is overwritten to an area on the frame buffer for the picture extracted in step S5, which is no longer used. When the decoding of one picture is finished, in step S8, the result of decoding is output as a decoded output frame image.

Figure 2:
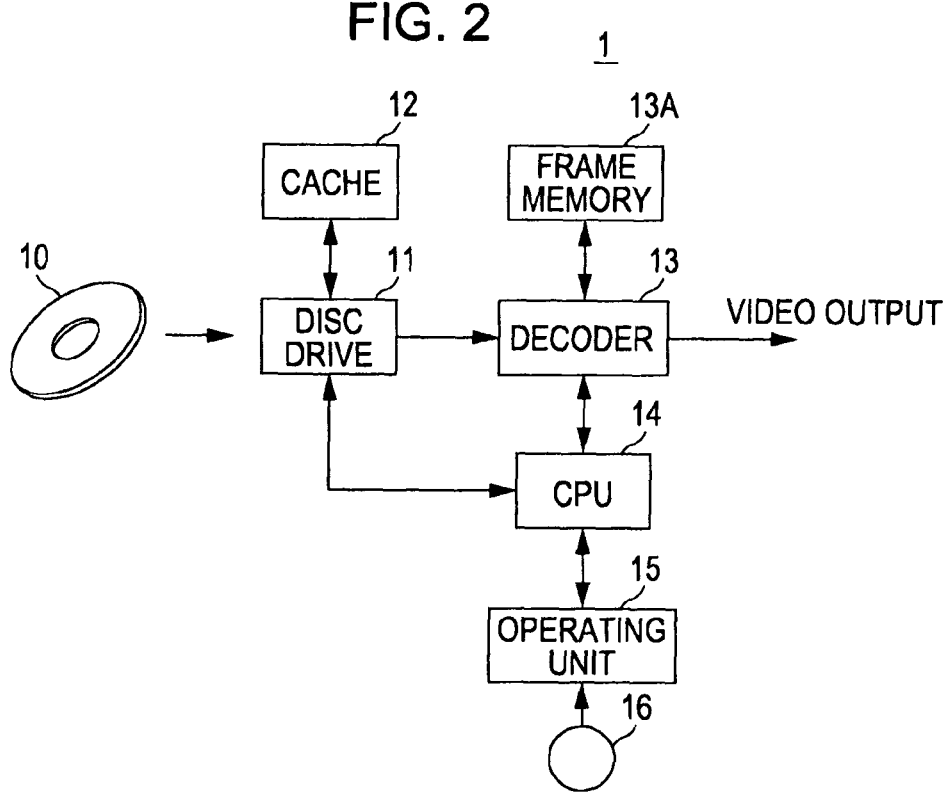
FIG. 2 is a block diagram schematically showing an example of the configuration of a playback apparatus that can be used in the embodiment of the present invention.

FIG. 2 schematically shows the configuration of a playback apparatus 1 that can be used in the embodiment of the present invention. The playback apparatus 1 uses an optical disc 10 as a recording medium. A central processing unit (CPU) 14 is connected to a read-only memory (ROM) and a random access memory (RAM) (not shown), and controls parts of the playback apparatus 1 according to programs stored in advance in the ROM. The RAM is used as a work memory for the CPU 14.

A disc drive 11, under the control of the CPU 14, reads data from a specified address of the optical disc 10 loaded thereon. The data that has been read is temporarily stored in a cache memory 12. According to an instruction by the CPU 14, a video stream is supplied from the cache memory 12 to a decoder 13, and the decoder 13 decodes the input video stream, as requested, using a frame memory 13A. The decoded stream is output as baseband video signals.

An operating unit 15 includes various operating elements, such as keys and switches. The operating unit 15 generates control signals corresponding to operations performed using the operating elements, and supplies the control signals to the CPU 14. The CPU 14 sends instructions to relevant parts of the playback apparatus 1 according to the control signals supplied thereto. The operating unit 15 includes, for example, a jog dial 16. The jog dial 16 is configured to output a signal corresponding to an angle of rotation. For example, the jog dial 16 generates, according to user's operations, control signals for specifying the forward playback direction or reverse playback direction or control signals for instructing the playback speed substantially in real time, and supplies these signals to the CPU 14.

The instructions for specifying the playback speed, playback direction, etc. are not necessarily entered by operations of the operating unit 15. For example, a command instructing a playback speed or playback direction may be sent to the playback apparatus 1 from another apparatus connected to the playback apparatus 1 via certain communication medium (not shown), such as an editing apparatus. In this case, the apparatus that sends the command to the playback apparatus 1 acts as an upper-layer apparatus relative to the playback apparatus 1.

Video streams that are handled by the playback apparatus 1 are streams that are encoded for compression according to the MPEG2 (Moving Picture Experts Group 2) standard, and GOPs (groups of pictures) in the streams are long GOPs and open GOPs.

Figure 3:
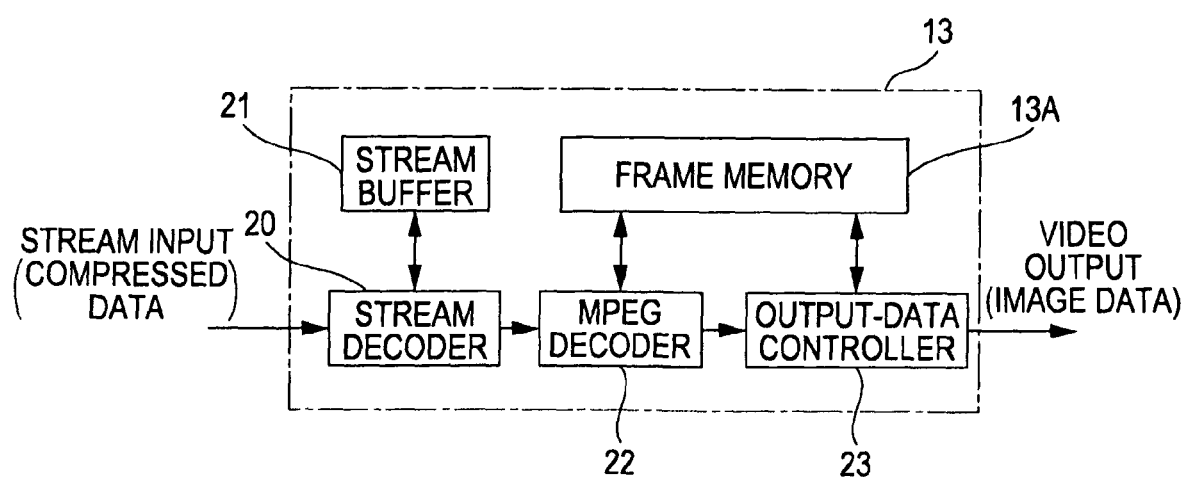
FIG. 3 is a block diagram schematically showing an example of the configuration of a decoder.

FIG. 3 schematically shows an example of the configuration of the decoder 13. Stream data that is read from the optical disc 10 and output from the disc drive 11 is, for example, an MPEG-ES (MPEG elementary stream). The MPEG-ES is supplied to a stream decoder 20. The stream decoder 20 analyzes the packet and header information of the input MPEG-ES to extract various parameters used for decoding and picture data encoded for compression and stored in the payload of the packet. The parameters are supplied to, for example, the CPU 14. The extracted picture data is stored in a stream buffer 21 in a predetermined manner.

An MPEG decoder 22 requests the stream decoder 20 to supply the picture data stored in the stream buffer 21, and decodes the picture data read from the stream buffer 21 according to the request and writes decoded picture data to the frame memory 13A. The MPEG decoder 22 also decodes other picture data (e.g., P pictures or B pictures) using the picture data written to the frame memory 13A.

As will be described later, the frame memory 13A has a capacity that is sufficient to allow playback in the forward direction and playback in the reverse direction with a constant delay. For example, the frame memory 13A has a capacity sufficient to store 9 frames of decoded pictures. As an example, the storage area of the frame memory 13A is divided into 9 banks each capable of storing data of one frame, and access is controlled on a bank-by-bank basis.

An output-data controller 23 manages video data that is output. For example, the output-data controller 23 reads frame data that is to be displayed next from the frame memory 13A according to an instruction by the CPU 14 corresponding to an operation of the operating unit 15. The frame data that has been read is output as baseband video signals.

Figure 4:
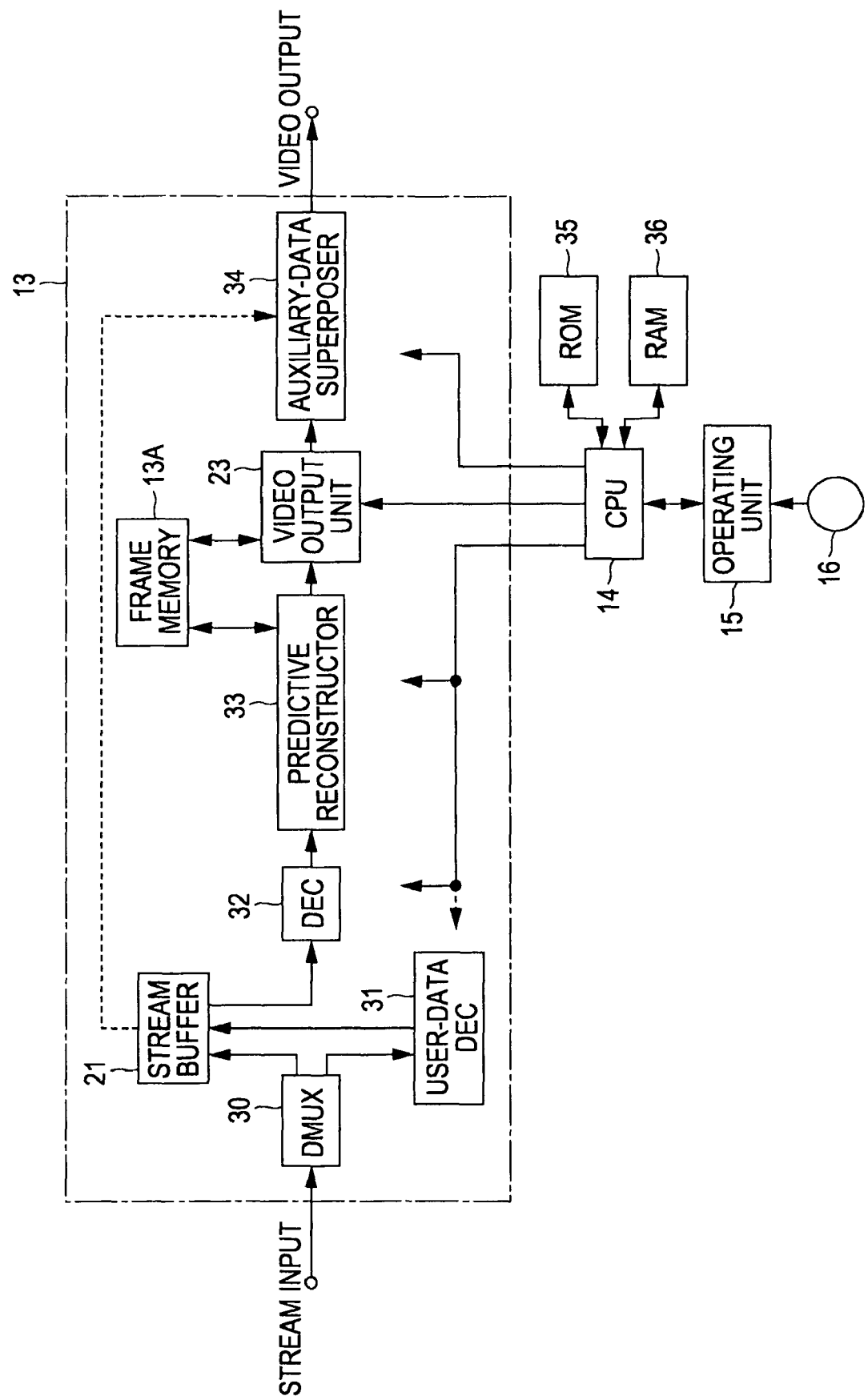
FIG. 4 is a block diagram more specifically showing the example of the configuration of the decoder.

FIG. 4 shows an example of the configuration of the decoder 13 more specifically. In FIG. 4, parts corresponding to those shown in FIG. 3 are designated by the same numerals, and detailed description thereof will be omitted. The MPEG-ES output from the disc drive 11 is supplied to a demultiplexer (DMUX) 30, where the packet is analyzed. The MPEG-ES and header information extracted from the packet are stored in the stream buffer 21. The header information of the packet is also supplied to a user-data decoder 31, where various parameters are extracted. The extracted parameters are stored in the stream buffer 21 in a predetermined manner.

A decoder 32 decodes the header information and MPEG-ES stored in the stream buffer 21. The decoder 32 decodes the header information to extract parameters used for decoding of pictures. The decoder 32 executes variable-length-code decoding, dequantization, and inverse DCT on the MPEG-ES on the basis of the parameters extracted from the header information, thereby decoding individual pictures. The picture data decoded by the decoder 32 is written to the frame memory 13A via a predictive reconstructor 33.

The predictive reconstructor 33 decodes pictures that have been inter-frame compressed through predictive coding, using the picture data written to the frame memory 13A. The pictures that have been inter-frame decompressed by decoding are again written to the frame memory 13A as frame data.

In response to user's operations of the jog dial 16 or the like for specifying the playback direction and playback speed, the operating unit 15 generates control signals indicating the playback direction and playback speed in a predetermined manner. The control signals are supplied to the CPU 14. Without limitation to control signals generated by the operating unit 15, control signals may be supplied as commands to the CPU 14 from an upper-layer apparatus via certain communication means (not shown), as described earlier.

The CPU 14 issues instructions to the video output unit 23 according to control signals supplied from the operating unit 15, thereby specifying frames that are to be output. A RAM 36 is used as a work memory for the CPU 14 as needed. The video output unit 23 reads the frames specified by the instructions from the frame memory 13A.

The frames that have been read are supplied to an auxiliary-data superposer 34. In the auxiliary-data superposer 34, video index information in a predetermined format, auxiliary data, etc. are superposed on the basis of the information stored in the stream buffer 21, and synchronization signals are attached, whereby output video signals are output.

Figure 5:
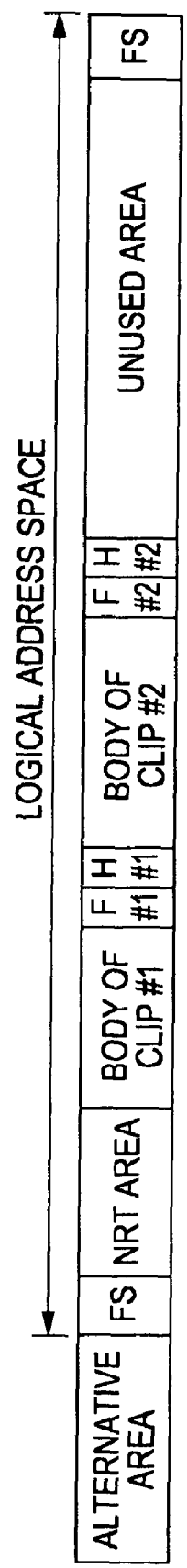
FIG. 5 is a diagram showing an example of data arrangement on a disc recording medium.

Next, a recording medium that can be used in the embodiment of the present invention will be described. First, an example of arrangement of data on a disc recording medium will be described with reference to FIG. 5. The data arrangement in the example shown in FIG. 5 is a typical data arrangement in a random access disc recording medium, such as a recordable optical disc or a hard disc. The logical address space is an area where arbitrary data can be recorded and played back.

In this embodiment, an optical disc is used as a recording medium. However, without limitation to an optical disc, other types of recording medium may be used in this embodiment. That is, this embodiment is applicable to other types of random access recording medium, such as a hard disc drive or a semiconductor memory.

At the beginning and end of the logical address space, a file system FS is disposed. Arbitrary data can be recorded within the logical address space in a predetermined format generally referred to as a file. Data on the recording medium is managed basically on the basis of files. File management information is recorded in the file system FS. A file-system layer of a system controller (described later) of a recording and playback apparatus can manage various types of data on a single recording medium by referring to and manipulating the information in the file system FS. As the file system FS, for example, the Universal Disk Format (UDF) is used, in which files are managed by units of 2 kB.

An alternative area is provided outside the logical address space. The alternative area can be used as an alternative to a defective area of the recording medium, in which reading and writing is not allowed physically. For example, when a defective area is recognized at the time of an access to the recording medium (particularly an access for recording), usually, the address of the defective area is replaced with an address in the alternative area.

The status of usage of the alternative area is stored in a predetermined area in the form of a defect list, and the defect list is used by a lower layer of a drive controller or a system controller of the recording and playback apparatus. That is, even when the alternative area is used, a lower layer of a drive controller or a system controller, described later, can access an appropriate area by referring to the defect list on occasion of an access to the recording medium. By using the alternative area as described above, an upper-layer application can record and play back data onto and from the recording medium without considering the presence or absence, location, etc. of a defective recording area on the recording medium.

In the case of a disc recording medium, the alternative area is often provided on the innermost side or the outermost side. When the rotation of the disc is controlled in a zone-constant manner, i.e., when the rotation speed of the disc is varied in a stepwise manner in the radial direction of the disc, in some cases, alternative areas are provided in individual zones. When the recording medium is a non-disc recording medium, such as a semiconductor memory, an alternative area is often provided on the side of the lowest physical address or the side of the highest physical address.

In an application that deals with audio data and video data (hereinafter collectively referred to as AV data), a set of data that serves as a unit that is to be played back continuously and synchronously, i.e., a unit that is to be played back in real time, is referred to as a clip. For example, a set of data acquired from the beginning to end of imaging by a video camera constitutes a clip. The clip is actually composed of a single file or a plurality of files. In this embodiment, a clip is composed of a plurality of files. The details of a clip will be described later.

In the logical address space, a non-real-time (NRT) area, in which arbitrary files other than clips can be recorded, is provided, for example, on the side of the beginning, and clips are sequentially disposed subsequently to the NRT area. The clips are disposed avoiding defective areas of the optical disc 10, so that the alternative area described earlier will not be used. Each clip has a header (H) and a footer (F) attached thereto. In this example, the header and the footer are disposed together on the side of the end of the clip.

In the following description, the clip that is recorded first on the optical disc 10 will be denoted as a clip #1, and subsequent clips will be denoted as a clip #2, a clip #3, . . . , with increasing clip numbers.

In the logical address space, an area where data is not recorded or an area where data had been recorded in the past but that is no longer used is managed as an unused area in the file system FS. When a file is newly recorded on the recording medium, a recording area is allocated on the basis of the unused area. Management information of the new file is added to the file system FS.

Figure 6:
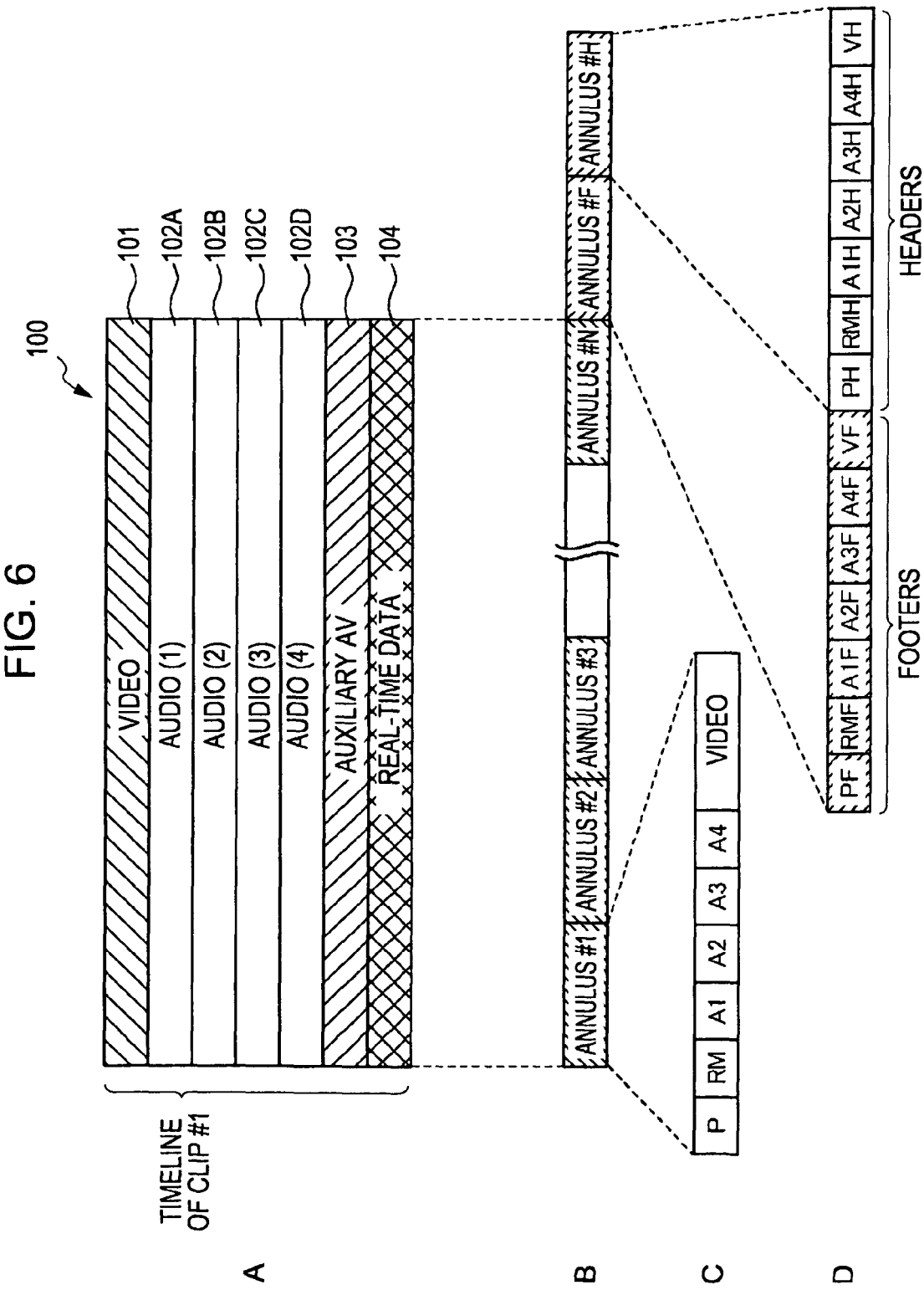
FIG. 6 is a diagram for explaining a clip.

When a recordable optical disc is used as the recording medium, in this embodiment, clips are recorded on the recording medium in the form of an annulus structure. The annulus structure will be described with reference to FIGS. 6 and 7. Part A of FIG. 6 shows an example of a clip 100 on a time line. In this example, the clip 100 includes 7 files, namely, video data 101, audio data 102A to 102D, auxiliary AV data 103, and real-time metadata 104.

The video data 101 is obtained by encoding baseband video data for compression, for example, at a high bitrate of 50 Mbps (megabits per second). The encoding for compression is based on, for example, the MPEG2 (Moving Picture Experts Group 2) standard. The audio data 102A, 102B, 102C, and 102D are baseband audio data each having 2 channels. Without limitation to the above, the audio data 102A, 102B, 102C, and 102D may be audio data obtained by compressing baseband audio data for compression at a high bit rate. The video data 101 and the audio data 102A to 102D are data that are actually broadcast or edited, and are referred to as mainline data.

The auxiliary AV data 103 is multiplexed data obtained by encoding baseband video data and audio data for compression at a bitrate lower than the bitrate for the mainline video data and audio data. The encoding for compression is based on, for example, the MPEG4 standard. The auxiliary AV data 103 is generated by encoding the mainline AV data for compression so that the bitrate is reduced, for example, to several Mbps. The auxiliary AV data 103 is used on behalf of the mainline data in order to carry out quick searching for playback, and is also referred to as proxy data.

Metadata is higher-level data regarding certain data, and functions as an index for representing the content of various types of data. Metadata can be classified into two types, namely, the real-time metadata 104, which arises along the timeline of the mainline AV data described above, and non-timeline metadata that arises in relation to specific segments such as individual scenes of the mainline AV data. The non-timeline metadata is recorded, for example, in the NRT area described with reference to FIG. 5.

The clip 100 is divided into units of a predetermined playback period (e.g., 2 seconds) and recorded in the form of an annulus structure on an optical disc, as in an example shown in part B of FIG. 6. The video data 101, the audio data (A1 to A4) 102A to 102D, the auxiliary AV data (P) 103, and the real-time metadata (RM) 104 are divided into units of the predetermined playback period and having data sizes not less than one track so as to have corresponding playback periods, and the divided units are sequentially arranged and recorded, as in an example shown in part C of FIG. 6. That is, pieces of data constituting the clip 100 and corresponding to units of the predetermined period are interleaved in the form of an annulus structure by units of the predetermined period and recorded on an optical disc.

Data forming annuli is referred to as annulus data. The annulus data has an amount of data that is an integer multiple of a minimum unit of recording on the disc. Furthermore, annuli are recorded so that the boundaries thereof are aligned with block boundaries of recording units on the disc.

Figure 7:
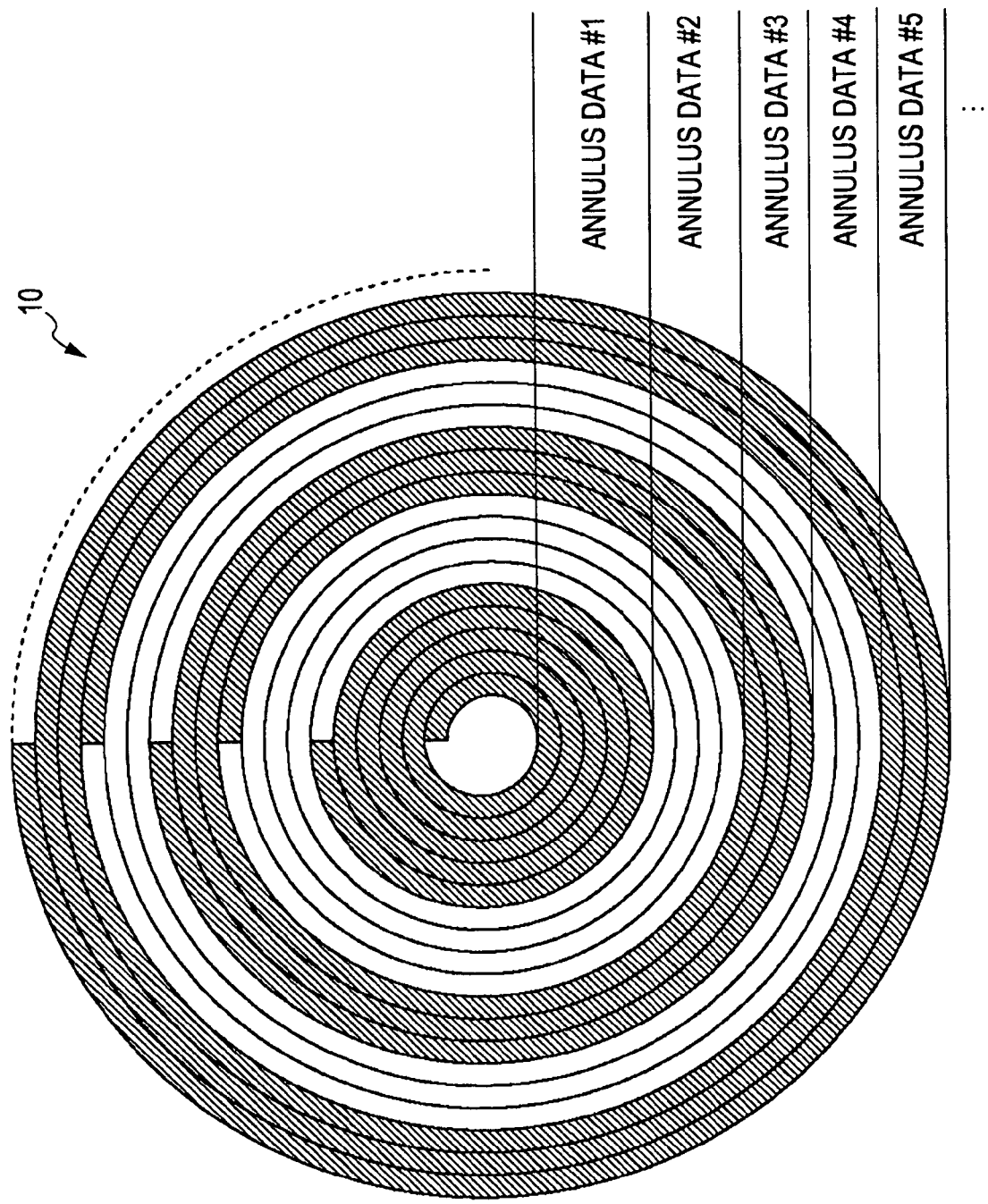
FIG. 7 is a diagram showing an example of annulus data on an optical disc.

FIG. 7 shows an example of annulus data on the optical disc 10. For example, as described with reference to part B of FIG. 6, annulus data #1, #2, #3, . . . corresponding to segments of one clip divided into units of the predetermined playback period are sequentially recorded from the inner side to the outer side of the optical disc 10. That is, data is arranged from the inner side to the outer side of the optical disc 10 continuously in accordance with the timeline of playback. In the example shown in FIG. 7, although not shown, the NRT area is disposed in an area inner than the annulus data #1 at the beginning.

In the HD format, encoding for compression at a variable bitrate is allowed. Furthermore, when long GOPs are used, the data size varies among an I picture, a P picture, and a B picture due to inter-frame compression encoding based on predictive coding. Thus, an access to a desired location is achieved using a picture-pointer file.

A picture pointer is offset information of each frame position in a clip. For example, MPEG2 allows variable-bitrate compression, i.e., the data compression rate can be varied among individual frames. For example, a frame representing a rather monotonous screen is encoded for compression at a rather high compression rate, and a frame representing a rather rough frame is encoded for compression at a rather low compression rate. By varying the compression rate in accordance with the characteristics of individual frames, it is possible to transmit and record video data of a relatively high resolution at a relatively low bitrate. Furthermore, in MPEG2, encoding for compression based on variable-length codes is also executed.

In the video data that has been encoded for compression with the bitrate varied as described above, frame positions vary among individual frames, and positions of GOPs, each including a plurality of frames sufficient to allow playback, vary among individual GOPs, so that, for example, it is difficult to jump to a desired position. Thus, in order to facilitate access in the case of variable-bitrate encoding, picture points representing offset information of individual frame positions in the clip are arranged in a table to form a non-timeline metadata file, and such a non-timeline metadata file is provided in association with each clip. For example, by reading the picture points in a predetermined manner when a disc is loaded on the drive, it is possible to quickly access a desired position in the clip.

Figure 8:
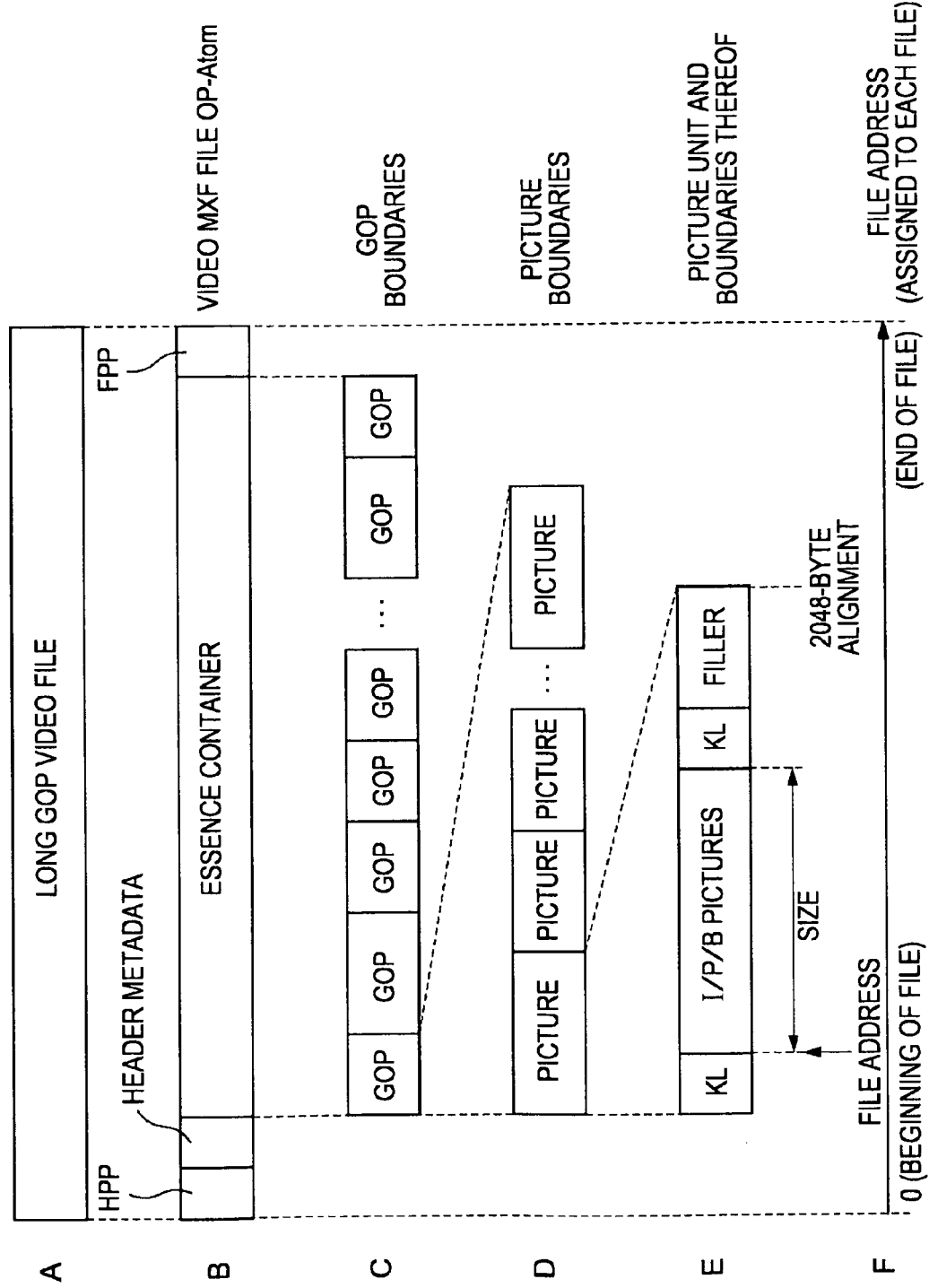
FIG. 8 is a diagram showing an example of the data structure of a long GOP in MPEG2.

Now, more specific description will be given with reference to FIGS. 8 and 9. FIG. 8 shows an example of data structure of a long GOP in MPEG2. For example, as shown in part A of FIG. 8, a long GOP file is composed of one clip. As shown in part B of FIG. 8, the long GOP file has a structure called a video MXF (Material Exchange Format) file OP-Atom. In the long GOP file, from the beginning, a header partition pack (HPP) and header metadata are disposed to constitute header information, and an essence container including the main video data is disposed subsequently. At the end of the file, a footer partition pack (FPP) is disposed.

As shown in part C of FIG. 8, the essence container includes an array of GOPs. As shown in part D of FIG. 8, each GOP includes a set of pictures. As shown in part E of FIG. 8, each picture includes KL (key, length) information at the beginning, then main data of an I, P, or B picture, and then KL information. At the end of the picture, filler is provided as appropriate to achieve byte alignment.

In the long GOP of MPEG2 having the structure described above, the amount of information of each picture, i.e., the size of the I, P, or B picture shown in part E of FIG. 8, is not fixed. Thus, for example, when playback is to be started from a certain frame in a log GOP video file, it is not possible to specify the position of the beginning of a picture corresponding to the frame in the long GOP video file in terms of a byte position or the like.

Thus, with reference to a file address (refer to part F of FIG. 8) represented in terms of the number of bytes from the beginning of the long GOP video file, for each picture included in the long GOP video file, picture-pointer information, including a file address, a size, a picture type (I, P, or B), and information indicating whether the picture is the picture in the GOP, is provided. The picture-pointer information is provided for each long GOP video file.

The filler at the end of the picture, shown in part E of FIG. 8, is adjusted so that the file address of the boundary of pictures corresponds to an integer multiple of a predetermined number of bytes, such as 2048 bytes. For example, it is preferable to use filler for adjustment so that the boundaries of pictures coincide with boundaries of minimum access units, such as sectors of the optical disc 10. This facilitates access on a picture-by-picture basis.

Figure 9:
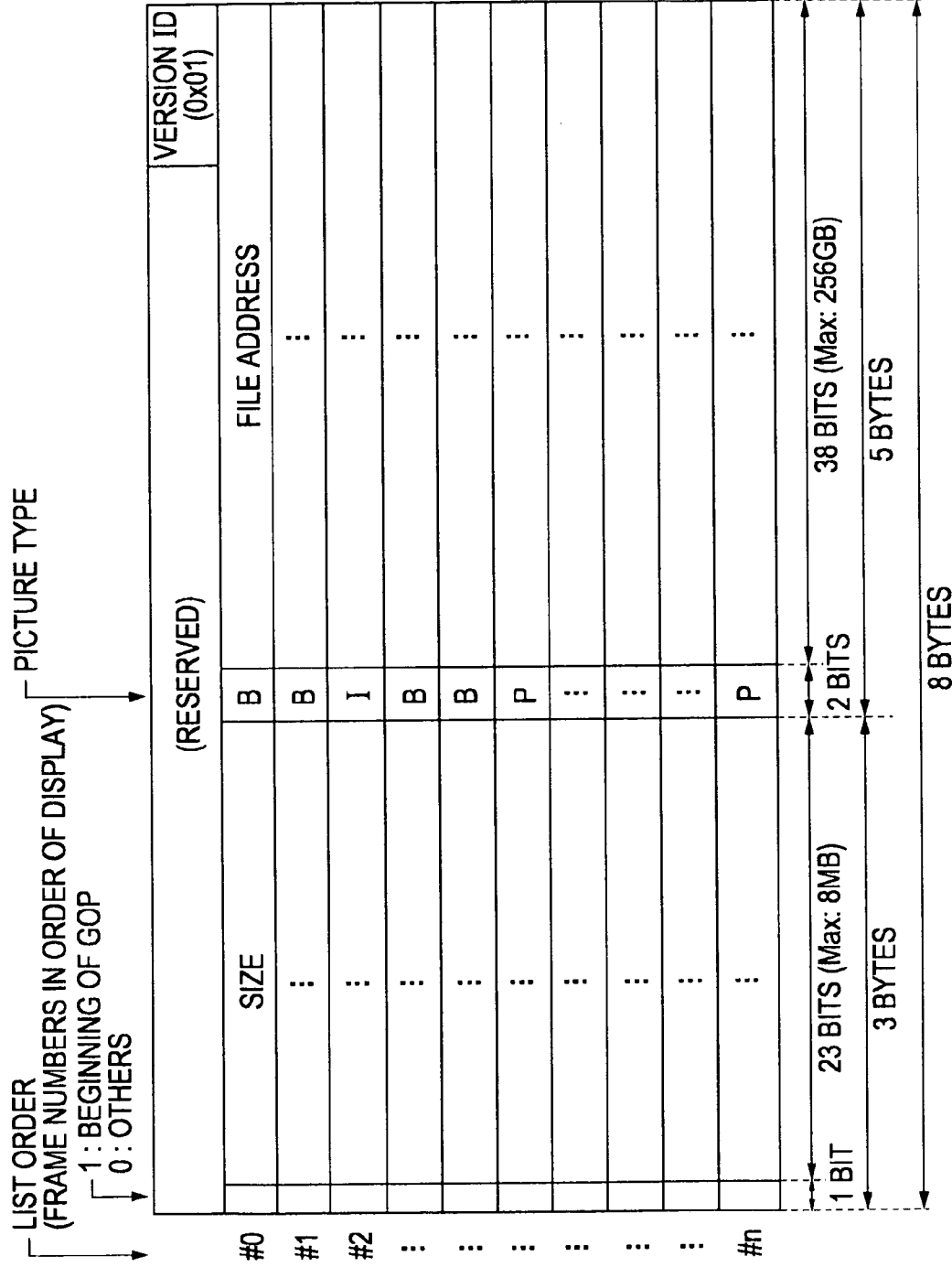
FIG. 9 is a diagram showing a more specific example of picture-pointer table representing picture-pointer information.

FIG. 9 shows a more specific example of picture-pointer table representing picture-pointer information. In the picture-pointer table of this example, data is written by units of 8 bytes. The 8 bytes at the beginning include a reserved area and version information of the picture-pointer table. Subsequently, 8 bytes are allocated to each frame, i.e., each picture, and a number of sets of this 8-byte information corresponding to the number of pictures included in the long GOP video file are arranged. The pictures are arranged in order of frames to be displayed.

Now, data of each picture will be described. The 1 bit at the beginning is a flag indicating whether the picture is the first picture in the GOP. For example, when a plurality of I pictures are included in a GOP, it is not possible to identify a GOP boundary with the positions of the I pictures alone. When it is not possible to identify a GOP boundary, it is not possible to recognize the position of a sequence header defined in MPEG2, so that a sequence header could be absent at the beginning of a stream input to the decoder. This situation can be avoided by assigning a flag indicating whether the picture is the first picture in the GOP to each picture. At the time of playback, a stream is input to the decoder on the basis of the flag.

The next 23 bits correspond to the size information of the picture, shown in part E of FIG. 8. By allocating 23 bits for size information, a data size up to 8 MB (megabytes) can be represented, so that 422@HL of the MPEG profile can be supported.

The next 2 bits represent a picture type. In the case of a B picture, information indicating a direction of reference is also included. More specifically, for example, the picture type is represented in the following manner:

00: I picture
10: P picture
01: B picture that is reconstructed with reference to a succeeding (future) frame, such as the first B picture in a long GOP video file in the case of an open GOP, or the first B picture in each GOP in the case of a closed GOP.
11: B picture that is reconstructed with reference to succeeding and preceding frames.

The next 38 bits represents a file address of the picture in the long GOP video file. By allocating 38 bits for the file address, long GOP video files of sizes up to 256 GB (gigabytes) can be supported. For example, it is possible to support the optical disc 10 having eight layers each having a recording capacity of 27 GB.

The picture-pointer table is recorded, for example, in the NRT area of the recording medium as a picture-pointer file together with non-timeline metadata. When the optical disc 10 is loaded on the disc drive 11, the disc drive 11 reads the non-timeline metadata and picture-pointer file recorded in the NRT area, and the optical disc 10 is mounted on the system of the playback apparatus 1. The non-timeline metadata and picture-pointer file that have been read are stored, for example, in the RAM of the CPU 14. The CPU 14 can access an arbitrary picture in a clip recorded on the optical disc 10 by referring to the picture-pointer table stored in the RAM.

Next, the playback control process according to the embodiment of the present invention will be described more specifically. First, the generation of a target frame-buffer pattern in step S2 shown in FIG. 1 will be described. First, a frame buffer size for playing back an arbitrary target playback frame and preceding and succeeding frames that are adjacent to the target playback frame in order of display is calculated.

Figure 10A:
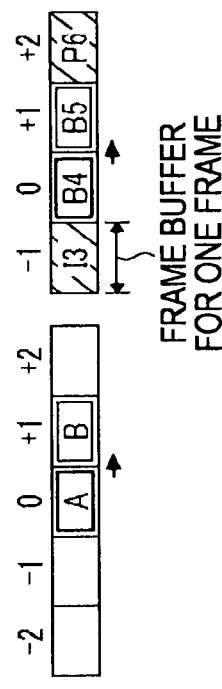
FIGS. 10A to 10C are diagrams showing examples of amount of buffer used for decoding a frame immediately succeeding or preceding a current frame in order of display.
Figure 10B:
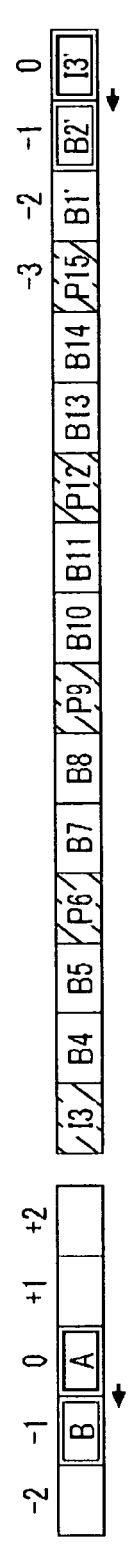
Figure 10C:

FIGS. 10A to 10C show examples of buffer amount that is used to decode a frame immediately succeeding or preceding a current frame (e.g., the target playback frame) in order of display. In FIGS. 10A to 10C, an output frame (current frame) is denoted by "0", and frames in the forward direction relative to the current frame in order of display, i.e., future (succeeding) frames, are denoted with "+", and frames in the reverse direction relative to the current frame in order of display, i.e., past (preceding) frames, are denoted with "−". In FIGS. 10A to 10C, "M" denotes the number of picture shifts from a reference picture to a next reference picture in a case where B pictures are intervening, and "N" denotes the number of pictures in a GOP. For example, when a GOP is composed of 15 pictures, namely, "$I_2B_0B_1P_5B_3B_4P_8B_6B_7P_{11}B_9B_{10}P_{14}B_{12}B_{13}$", M=3 and N=15.

FIG. 10A shows an example where playback proceeds by one frame in the forward direction. In this case, a largest amount of buffer is used when M=3 and the target playback frame is a succeeding B picture among adjacent B pictures in order of display. In this case, the playback proceeds from the target playback frame to the next B picture at the timing of the next frame.

More specifically, in this case, the $B_4$ picture and $B_5$ picture are decoded using the $I_3$ picture and $P_6$ picture, respectively. Until the decoding of the $B_5$ picture is finished, it is not allowed to discard the $I_3$ picture from the buffer, and the $P_6$ picture is stored in the buffer since it is displayed next to the $B_5$ picture. Thus, an amount of buffer corresponding to M+1=4 pictures is used.

FIG. 10B shows an example where playback proceeds (reverses) by one frame in the reverse direction. In the case of an ordinary open GOP with M=3 and N=15, a largest amount of buffer is used when the target playback frame is the $I_3$' picture. In this case, the playback shifts from the target playback frame to the $B_2$' picture that is preceding in order of display at the timing of the next frame.

More specifically, in this case, in order to decode the $B_2$' picture, the $I_3$' picture and the $P_{15}$ picture preceding the $B_2$' picture in order of display are used to decode the $B_2$' picture, and in order to decode the $P_{15}$ picture, the $I_3$ picture, $P_6$ picture, $P_9$ picture, and $P_{12}$ picture in the GOP to which the $P_{15}$ picture belongs are used. Thus, an amount of buffer corresponding to N/M+2=7 pictures is used, where N/M corresponds to the number of I pictures and P pictures included in the GOP.

FIG. 10C shows an example where a shift by one frame in either the forward direction or the reverse direction is considered. In the case of an ordinary open GOP with M=3 and N=15, a largest amount of buffer is used when the target playback frame is the $I_3'$ picture. In this case, the playback shifts to the $B_4'$ picture or $B_2'$ picture succeeding or preceding the $I_3'$ picture in order of display.

More specifically, this example is a combination of the example shown in FIG. 10A and the example shown in FIG. 10B. Thus, in order to decode the $B_4'$ picture succeeding the $I_3'$ picture as the target playback frame in order of display, the $I_3'$ picture and the $P_6$ picture, which is a reference picture that appears next to the $I_3'$ picture, are used. Furthermore, in order to decode the $B_2'$ picture preceding the $I_3'$ picture in order of display, the $I_3'$ picture, and the $I_3$ picture, $P_6$ picture, $P_9$ picture, $P_{12}$ picture, and $P_{15}$ picture in the GOP preceding the GOP to which the $I_3'$ picture belongs are used. Thus, an amount of buffer corresponding to N/M+M+1=9 pictures is used.

As described above, when the playback shifts from the target playback frame to preceding and succeeding adjacent frames in order of display, an amount of buffer corresponding to 9 pictures is used.

According to this embodiment, in a frame buffer, a buffer updating pattern is generated so that adjacent pictures preceding and succeeding a target playback frame in order of display can be constantly displayed with a constant delay. That is, in relation to a target playback frame having been decoded and existing in the buffer, preceding and succeeding adjacent frames in order of display constantly exist in the buffer in decoded forms. Furthermore, frames that are used to continue playback in the reverse direction and frames that are used to continue playback in the forward direction are constantly stored in the buffer in decoded forms. Such a pattern on the buffer is generated for each of all the patterns formed by shifting the target playback frame on a frame-by-frame basis.

Under this condition, when the target playback frame is shifted by one frame and is thereby updated, data that is to be newly decoded is constantly data corresponding to one frame, regardless of whether the playback direction is forward or reverse. Thus, using a normal speed decoder, variable-speed playback within a normal speed in the forward playback direction and the reverse playback direction can be achieved.

Furthermore, under this condition, with the command speed between the normal speed playback in the reverse direction and the normal speed playback in the forward direction, outputs of playback can be obtained with a constant delay.

Figure 11:
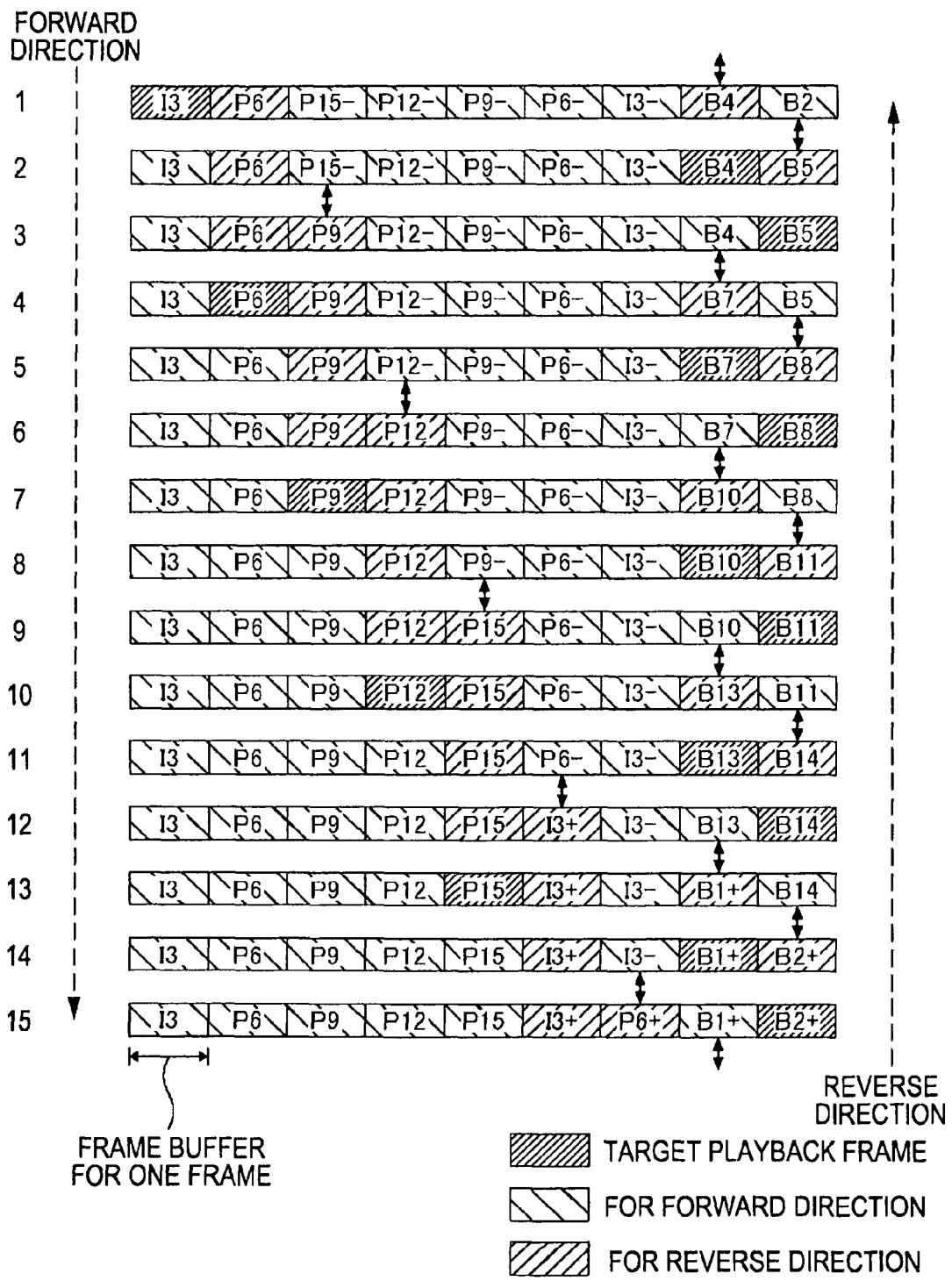
FIG. 11 is a diagram showing an example of updating pattern of a target frame buffer in the embodiment of the present invention.

FIG. 11 shows an example of updating pattern of the target frame buffer generated according to the scheme described above. The example shown in FIG. 11 relates to a case of a long GOP with N=15 and M=3. Since one GOP includes 15 pictures (frames), 15 patterns are defined. As indicated on the rows in FIG. 11, when the target playback frame is shifted frame by frame in an arbitrary direction with a frame corresponding to the target playback frame stored in the frame buffer, it suffices to update only one frame. Thus, using a normal speed decoder, it is possible to achieve variable-speed playback within the normal speed in the forward direction and the reverse direction.

In FIG. 11, I, P, and B denote frames based on an I picture, a P picture, and a B picture, respectively, and attached numerals represent display orders in the GOP. No sign is assigned to a frame based on a picture belonging to a reference GOP (current GOP). A frame based on a picture belonging to a GOP (referred to as GOP(−)) immediately preceding the current GOP is denoted with a minus sign (−). A frame based on a picture belonging to a GOP (referred to as GOP(+)) immediately succeeding the current GOP is denoted with a plus sign (+).

In the updating pattern shown in FIG. 11, the downward direction corresponds to playback in the forward direction, and the upward direction corresponds to playback in the reverse direction. That is, shifting downward by one row in FIG. 11 corresponds to the target playback frame proceeding by one frame, and shifting upward by one row in FIG. 11 corresponds to the target playback frame reversing by one frame. The updating pattern shown in FIG. 11 is circular, so that when the target playback frame reverses by one frame from the first row, the shift results in the frame buffer storage pattern on the 15th row.

In the frame-buffer updating pattern shown in FIG. 11, the 1st row shows an example of pattern in a case where the target playback frame is the frame "I3". Frames that are used for proceeding from the target playback frame "$I_3$" by one frame in the forward direction are the frames "B4" and "P6". Frames that are used for reversing from the target playback frame by one frame in the reverse direction are the frames "B2", "P15−", "P12−", "P9−", "P6−", and "I3−".

The 2nd row shows an example of pattern in a case where the target playback frame is the frame "B4". Frames that are used for proceeding from the target playback frame "B4" by one frame in the forward direction are the frames "B5" and "P6". Frames that are used for reversing from the target playback frame by one frame in the reverse direction are the frames "I3", "P15−", "P12−", "P9−", "P6−", and "I3−".

The 3rd row shows an example of pattern in a case where the target playback frame is the frame "B5". Frames that are used for proceeding from the target playback frame "B5" by one frame in the forward direction are the frames "P6" and "P9". Frames that are used for reversing from the target playback frame by one frame in the reverse direction are the frames "B4", "I3", "P12−", "P9−", "P6−", and "I3−".

The 4th row shows an example of pattern in a case where the target playback frame is the frame "P6". Frames that are used for proceeding from the target playback frame "P6" by one frame in the forward direction are the frames "B7" and "P9". Frames that are used for reversing from the target playback frame by one frame in the reverse direction are the frames "B5", "I3", "P12−", "P9−", "P6−", and "I3−".

The 5th row shows an example of pattern in a case where the target playback frame is the frame "B7". Frames that are used for proceeding from the target playback frame "B7" by one frame in the forward direction are the frames "B8" and "P9". Frames that are used for reversing from the target playback frame by one frame in the reverse direction are the frames "P6", "I3", "P12−", "P9−", "P6−", and "I3−".

The 6th row shows an example of pattern in a case where the target playback frame is the frame "B8". Frames that are used for proceeding from the target playback frame "B8" by one frame in the forward direction are the frames "P9" and "P12". Frames that are used for reversing from the target playback frame by one frame in the reverse direction are the frames "B7", "P6", "I3", "P9−", "P6−", and "I3−".

The 7th row shows an example of pattern in a case where the target playback frame is the frame "P9". Frames that are used for proceeding from the target playback frame "P9" by one frame in the forward direction are the frames "B10" and "P12". Frames that are used for reversing from the target playback frame by one frame in the reverse direction are the frames "P6", "I3", "P9−", "P6−", and "I3−".

The 8th row shows an example of pattern in a case where the target playback frame is the frame "B10". Frames that are used for proceeding from the target playback frame "B10" by one frame in the forward direction are the frames "B11" and "P12". Frames that are used for reversing from the target playback frame by one frame in the reverse direction are the frames "P9", "P6", "I3", "P9–", "P6–", and "I3–".

The 9th row shows an example of pattern in a case where the target playback frame is the frame "B11". Frames that are used for proceeding from the target playback frame "B11" by one frame in the forward direction are the frames "P12" and "P15". Frames that are used for reversing from the target playback frame by one frame in the reverse direction are the frames "B10", "P9", "P6", "I3", "P6–", and "I3–".

The 10th row shows an example of pattern in a case where the target playback frame is the frame "P12". Frames that are used for proceeding from the target playback frame "P12" by one frame in the forward direction are the frames "B13" and "P15". Frames that are used for reversing from the target playback frame by one frame in the reverse direction are the frames "B11", "P9", "P6", "I3", "P6–", and "I3–".

The 11th row shows an example of pattern in a case where the target playback frame is the frame "B13". Frames that are used for proceeding from the target playback frame "B13" by one frame in the forward direction are the frames "B14" and "P15". Frames that are used for reversing from the target playback frame by one frame in the reverse direction are the frames "P12", "P9", "P6", "I3", "P6–", and "I3–".

The 12th row shows an example of pattern in a case where the target playback frame is the frame "B14". Frames that are used for proceeding from the target playback frame "B14" by one frame in the forward direction are the frames "P15" and "I3+". Frames that are used for reversing from the target playback frame by one frame in the reverse direction are the frames "B13", "P12", "P9", "P6", "I3", and "I3–".

The 13th row shows an example of pattern in a case where the target playback frame is the frame "P15". Frames that are used for proceeding from the target playback frame "P15" by one frame in the forward direction are the frames "B1+" and "I3+". Frames that are used for reversing from the target playback frame by one frame in the reverse direction are the frames "B14", "P12", "P9", "P6", "I3", and "I3–".

The 14th row shows an example of pattern in a case where the target playback frame is the frame "B1+". Frames that are used for proceeding from the target playback frame "B1+" by one frame in the forward direction are the frames "B2+" and "I3+". Frames that are used for reversing from the target playback frame by one frame in the reverse direction are the frames "P15", "P12", "P9", "P6", "I3", and "I3–".

The 15th row shows an example of pattern in a case where the target playback frame is the frame "B2+". Frames that are used for proceeding from the target playback frame "B2+" by one frame in the forward direction are the frames "I3+" and "P6+". Frames that are used for reversing from the target playback frame by one frame in the reverse direction are the frames "B1+", "P15", "P12", "P9", "P6", and "I3".

As described above, in the example of frame-buffer updating pattern shown in FIG. 11, between each pair of adjacent patterns associated with frames, only a portion corresponding to one frame is updated. More specific description will be given with some examples.

As a first example, a case where the target playback frame is the frame "P6" based on a P picture will be described. In this case, in a playback speed range within the normal speed in the forward direction and the reverse direction, frames that can be a new target playback frame at a timing succeeding the target playback frame by one frame are the frame "P6" and the preceding and succeeding frames "B5" and "B7" adjacent to the frame "P6" in order of display.

When the target playback frame is the frame "P6", under the condition where frames that have been decoded according to a target frame-buffer pattern generated on the basis of the target playback frame have been stored in the frame buffer (refer to the pattern on the 4th row in FIG. 11), the target playback frame "P6" and the preceding and succeeding frames "B5" and "B7" are already stored in the frame buffer in decoded forms.

When the target playback frame shifts from this state to the frame "B5" or "B7", on the basis of the new target frame-buffer pattern for the new target playback frame, a frame that is to be newly used is stored in the frame buffer in a decoded form.

In the other area of the frame buffer storing these pieces of data, data at the immediately preceding timing is maintained. In the example shown in FIG. 11, as indicated on the 4th row, when the target playback frame is the frame "P6", the frame "P6", the frames "I3", "P9", "B5", and "B7" belonging to the same GOP as the frame "P6", and the frames "I3–", "P6–", "P9–", and "P12–", belonging to the GOP immediately preceding the GOP to which the frame "P6" belongs are stored in the frame buffer.

When the target playback frame is the frame "P6", if the target playback frame is shifted by one frame in the forward direction, the frame "B7" becomes a new target playback frame. Frames that can be a further new target playback frame at a timing succeeding the new target playback frame by one frame are the frame "B7" and the preceding and succeeding frames "P6" and "B8" adjacent to the frame "B7" in order of display.

When the playback speed is within the normal speed in the forward direction and the reverse direction, it is possible that the same frame is output successively at timings of two frames. In this case, even when the frame timing proceeds to the next timing, the target playback frame does not change.

Of these frames, the frame "P6" is the current target playback frame, so that the frame "P6" already exists on the frame buffer. Furthermore, in order to decode the frame "B8", the frames "P6" and "P9" are used. Since the frames "P6" and "P9" are used to decode the frame "B7", the frames "P6" and "P9" already exist on the frame buffer. The frame "B8" is decoded using these frames "P6" and "P9".

When the target playback frame is shifted to the frame "B7", the frame "B5", which had been adjacent to the frame "P6" as the target playback frame in the reverse direction in order of display, is no longer used, so that the frame "B5" is discarded. In the area of the discarded frame "B5", the frame "B8", which is newly decoded, is stored, whereby the frame buffer is updated.

When playback is reversed by one frame in the reverse direction, the frame "B5" becomes a new target playback frame. Frames that can be a further new target playback frame at a timing succeeding the new target playback frame by one frame are the frames "B5", "B4", and "P6". The frame "P6" is the current target playback frame, so that the frame "P6" already exists on the frame buffer. Furthermore, in order to decode the frame "B4", the frames "I3" and "P6" are used, so that the frame "I3" is stored in the frame buffer. The frame "B4" is decoded using these frames "I3" and "P6".

When the target playback frame is shifted from the frame "P6" to the frame "B5", the frame "B7", which had been adjacent to the frame "P6" as the target playback frame in the forward direction, is no longer used, so that the frame "B7" is discarded. In the area of the frame buffer for the discarded frame "B7", the frame "B4", which is newly decoded, is stored, whereby the frame buffer is updated.

As described above, when the target playback frame proceeds from the frame "P6" by one frame in the forward direction, the updating of frames involves only a portion corresponding to one frame, i.e., updating from the frame "B5" to the frame "B8". Also, when the target playback frame is reversed from the frame "P6" by one frame in the reverse direction, the updating of frames involves only a portion corresponding to one frame, i.e., updating from the frame "B7" to the frame "B4".

As a second example, a case where the target playback frame is the frame "B7" based on a B picture will be described. In this case, in a playback speed range within the normal speed in the forward direction and the reverse direction, frames that can be a new target playback frame at a timing succeeding the target playback frame by one frame are the frame "B7", and the preceding and succeeding frames "P6" and "B8" adjacent to the frame "B7" in order of display.

When the target playback frame is the frame "B7", under the condition where frames that have been decoded according to a target frame-buffer pattern generated on the basis of the target playback frame have been stored in the frame buffer (refer to the pattern on the 5th row in FIG. 11), the target playback frame "B7" and the preceding and succeeding frames "P6" and "B8" are already stored in the frame buffer in decoded forms.

When the target playback frame shifts from this state to the frame "P6" or "B8", on the basis of the new target frame-buffer pattern for the new target playback frame, a frame that is to be newly used is stored in the frame buffer in a decoded form.

In the other area of the frame buffer storing these pieces of data, data at the immediately preceding timing is maintained. In the example shown in FIG. 11, as indicated on the 5th row, when the target playback frame is the frame "B7", the frame "B7", the frames "I3", "P9", and "B8" belonging to the same GOP as the frame "B7", and the frames "I3–", "P6–", "P9–", and "P12" belonging to the GOP immediately preceding the GOP to which the frame "B7" belongs are stored in the frame buffer.

When the target playback frame is the frame "B7", if the target playback frame is shifted by one frame in the forward direction, the frame "B8" becomes a new target playback frame. Frames that can be a further new target playback frame at a timing succeeding the new target playback frame by one frame are the frame "B8" and the preceding and succeeding frames "B7" and "P9" adjacent to the frame "B8" in order of display.

Of these frames, the frame "B7" is the current target playback frame, so that the frame "B7" already exists on the frame buffer. Furthermore, in order to decode the frame "B8", the frames "P6" and "P9" are used. Since the frames "P6" and "P9" are used to decode the frame "B7", the frames "P6" and "P9" already exist on the frame buffer. The frame "B8" is decoded using these frames "P6" and "P9". Also, the frame "P9" already exists on the frame buffer.

In this case, the frame "P6", which had been adjacent to the frame "B7" as the target playback frame in the reverse direction in order of display, is used to decode the frame "B8", so that the frame "P6" is not discarded. The frame "P12", which is used when playback further proceeds by one frame in the forward direction, is decoded using the frame "P9". Furthermore, of the frames belonging to the earliest GOP existing in the buffer memory, the frame "P12-", which is the latest frame existing in the buffer memory, is discarded, and the frame "P12" is stored in a decoded form.

When playback is reversed by one frame in the reverse direction, the frame "P6" becomes a new target playback frame. Frames that can be a further new target playback frame at a timing succeeding the new target playback frame by one frame are the frames "P6", "B5", and "B7". The frame "B7" is the current target playback frame, so that the frame "B7" already exists on the frame buffer. Furthermore, in order to decode the frame "B5", the frames "I3" and "P6" are used, so that the frame "I3" is stored in the frame buffer. The frame "B5" is decoded using these frames "I3" and "P6".

When the target playback frame is shifted from the frame "B7" to the frame "P6", the frame "B8", which had been adjacent to the frame "B7" as the target playback frame in the forward direction, is no longer used, so that the frame "B8" is discarded. In the area of the frame buffer for the discarded frame "B8", the frame "B5", which is newly decoded, is stored, whereby the frame buffer is updated.

As described above, when the target playback frame proceeds from the frame "B7" by one frame in the forward direction, the updating of frames involves only a portion corresponding to one frame, i.e., updating from the frame "P12-" to the frame "P12". Also, when the target playback frame is reversed from the frame "B7" by one frame in the reverse direction, the updating of frames involves only a portion corresponding to one frame, i.e., updating from the frame "B8" to the frame "B5".

As a third example, a case where the target playback frame is the frame "I3" based on an I picture will be described. In this case, in a playback speed range within the normal speed in the forward direction and the reverse direction, frames that can be a new target playback frame at a timing succeeding the target playback frame by one frame are the frame "I3" and the preceding and succeeding frames "B2" and "B4" adjacent to the frame "I3" in order of display.

When the target playback frame is the frame "I3", under the condition where frames that have been decoded according to a target frame-buffer pattern generated on the basis of the target playback frame have been stored in the frame buffer (refer to the pattern on the 1st row in FIG. 11), the target playback frame "I3" and the preceding and succeeding frames "B2" and "B4" are already stored in the frame buffer in decoded forms.

When the target playback frame shifts from this state to the frame "B2" or "B4", on the basis of the new target frame-buffer pattern for the new target playback frame, a frame that is to be newly used is stored in the frame buffer in a decoded form.

In the other area of the frame buffer storing these pieces of data, data at the immediately preceding timing is maintained. In the example shown in FIG. 11, as indicated on the 1st row, when the target playback frame is the frame "I3", the frame "I3", the frames "P6", "B2", and "B4" belonging to the same GOP as the frame "I3", and the frames "I3–", "P6–", "P9", "P12–", and "P15" belonging to the GOP immediately preceding the GOP to which the frame "I3" belongs are stored in the frame buffer.

When the target playback frame is the frame "I3", if the target playback frame is shifted by one frame in the forward direction, the frame "B4" becomes a new target playback frame. Frames that can be a further new target playback frame at a timing succeeding the new target playback frame by one frame are the frame "B4" and the preceding and succeeding frames "I3" and "B5" adjacent to the frame "B4" in order of display.

Of these frames, the frame "I3" is the current target playback frame, so that the frame "I3" already exists on the frame buffer. Furthermore, in order to decode the frame "B5", the frames "I3" and "P6" are used. Since the frames "P6" is used to decode the frame "B4", the frame "P6" already exists on the frame buffer. The frame "B5" is decoded using these frames "I3" and "P6".

In this case, the frame "B2", which had been adjacent to the frame "I3" as the target playback frame in the reverse direction, is no longer used, so that the frame "B2" is discarded. In the area of the frame buffer for the discarded frame "B2", the frame "B5", which is newly decoded, is stored, whereby the frame buffer is updated.

When playback is reversed by one frame in the reverse direction, the frame "B2" becomes a new target playback frame. Frames that can be a further new target playback frame at a timing succeeding the new target playback frame by one frame are the frames "B2", "B1", and "I3". The frame "I3" is the current target playback frame, so that the frame "I3" already exists on the frame buffer. Furthermore, in order to decode the frame "B1", the frames "I3" and the frame "P15−" belonging to the GOP immediately preceding the GOP to which the frame "I3" belongs are used. The frame "B1" is decoded using these frames "P15−" and "I3".

When the target playback frame is shifted from the frame "I3" to the frame "B2", the frame "B4", which had been adjacent to the frame "I3" as the target playback frame in the forward direction, is no longer used, so that the frame "B4" is discarded. In the area of the discarded frame "B4", the frame "B1", which is newly decoded, is stored, whereby the frame buffer is updated.

As described above, when the target playback frame proceeds from the frame "I3" by one frame in the forward direction, the updating of frames involves only a portion corresponding to one frame, i.e., updating from the frame "B2" to the frame "B5". Also, when the target playback frame is reversed from the frame "I3" by one frame in the reverse direction, the updating of frames involves only a portion corresponding to one frame, i.e., updating from the frame "B4" to the frame "B1".

As described above, when the target playback frame is shifted to another frame, one frame stored in the buffer memory is discarded, and one new frame is decoded and stored in the area of the discarded frame, whereby the buffer memory is updated. At this time, the frame that is discarded from the buffer memory can be determined according to the following rules:

(1) A frame based on a B picture other than the target playback frame and the frames adjacent to the target playback frame in order of display is discarded.
(2) When no frame based on a B picture that is to be discarded according to the rule (1) exists, a frame based on an I picture or a P picture, existing on the buffer memory and satisfying the condition (2a) or (2b) below, is discarded.
(2a) In the case of shifting of the target playback frame in the forward direction, an I picture or P picture at the end of a GOP that is remotest in the reverse direction from a GOP including the target playback frame.
(2b) In the case of shifting of the target playback frame in the reverse direction, an I picture or P picture at the end of a GOP that is remotest in the forward direction from a GOP including the target playback frame.

As described above, by storing data on the buffer memory in accordance with the buffer-memory updating pattern according to the embodiment of the present invention, regardless of whether the current target playback frame is a frame based on an I picture, a frame based on a P picture, or a frame based on a B picture, in relation to shifting by one frame in an arbitrary direction, it suffices to update only data corresponding to one frame on the buffer memory. Thus, using a normal speed decoder, variable-speed playback within the normal speed in the forward direction and the reverse direction can be achieved with a constant delay.

Although the above description has been given in the context of examples where the current target playback frame is a frame based on an I picture, a P picture, and a B picture in a GOP, respectively, also in cases where the current target playback frame is any other frame for which description is omitted, similarly, in relation to shifting by one frame in an arbitrary direction, only data corresponding to one frame on the buffer memory is updated.

Next, an example of method of generating a target frame-buffer pattern will be described with reference to a flowchart shown in FIG. 12. In the following description, it is assumed that a target frame (referred to as a current frame) is a frame based on a B picture.

Figure 13A:
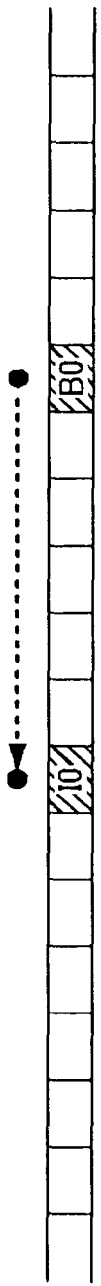
FIGS. 13A to 13F are diagrams showing examples of creation of a target frame-buffer pattern.
Figure 14A:
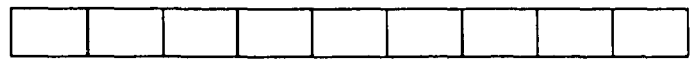
FIGS. 14A to 14F are diagrams showing examples of creation of a target frame-buffer pattern.

First, in step S10, an I picture (I0) of a current GOP to which a current frame belongs is obtained. The I picture is searched for in the reverse direction on the recording medium from the picture corresponding to the current frame, as in an example shown in FIG. 13A. At this stage, no frame of the target frame-buffer pattern has been determined (refer to FIG. 14A).

Figure 13B:
Figure 14B:

When the first I picture (I0) in the current GOP has been obtained, in step S11, an I picture or P picture (P0) at or subsequent to a position corresponding to two frames from the current frame is searched for in the forward direction on the recording medium from the picture corresponding to the current frame (refer to FIG. 13B). At this stage, no frame of the target frame-buffer pattern has been determined (refer to FIG. 14B).

Figure 13C:
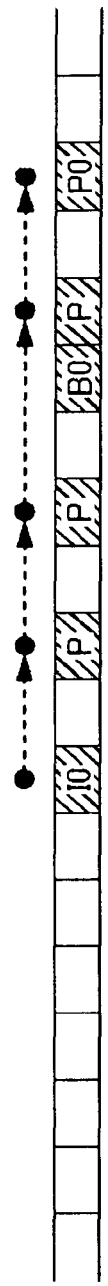
Figure 14C:

In step S12, I and/or P pictures between the pictures (I0) and (P0) obtained in steps S10 and S11 described above are searched for from the recording medium. For example, as in an example shown in FIG. 13C, the picture (I0) found by the searching in step S10 is determined as a frame that is used in the target frame-buffer pattern. Furthermore, a next P picture (P) is searched for in the forward direction on the recording medium from the picture (I0). The P picture found by the searching is determined as a frame that is used in the target frame-buffer pattern. As described above, on the basis of P or I pictures sequentially found by searching from the recording medium, frames of the current GOP that are used in the target frame-buffer pattern are sequentially determined (refer to FIG. 14C).

Figure 13D:
Figure 14D:
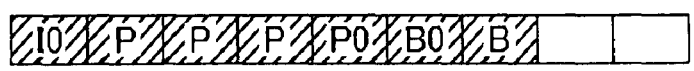
Figure 14E:

When frames based on I and P pictures of the current GOP are determined as frames used in the target frame-buffer pattern in step S12, in step S13, B pictures existing in a range of a frame preceding the current frame by one frame to a frame succeeding the current frame by one frame are searched for in the reverse direction on the recording medium (refer to FIG. 13D). The frames based on the B pictures found by the searching are determined as frames of the current GOP that are used in the target frame-buffer pattern (refer to FIG. 14D).

That is, through steps S11 and S12 described earlier, frames based on I and/or P pictures, used to decode B pictures existing in a range of a frame preceding the current frame by one frame to a frame succeeding the current frame by one frame, have been determined as frames that are used in the target frame-buffer pattern. In step S13, the frames based on the B pictures that are decoding using the frames based on the I and/or P pictures are determined as frames that are used in the target frame-buffer pattern.

Figure 13E:
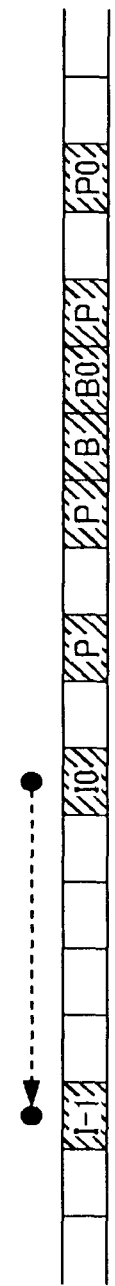
Figure 13F:
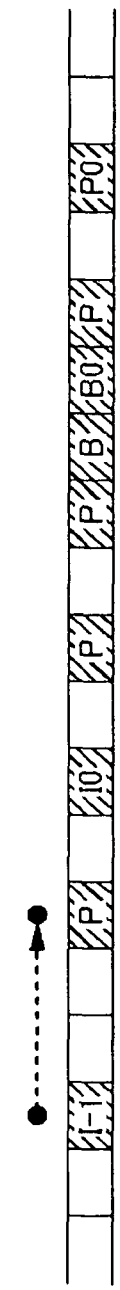
Figure 14F:

When all the frames of the current GOP that are used in the target frame-buffer pattern have been determined through the processing up to step S13, in step S14, the first I picture (I−1) in the GOP immediately preceding the current GOP is searched for (refer to FIG. 13E). For example, the I picture is searched for in the reverse direction on the recording medium from the first I picture (I0) in the current GOP, and P pictures are searched for in the forward direction on the recording medium on the basis of the I picture (I−1) found by the searching (refer to FIG. 13F). Then, frames based on I and/or P pictures in the GOP immediately preceding the current GOP, found by the searching, are determined as frames that are used in the target frame-buffer pattern (refer to FIG. 14F).

The processing in steps S14 and S15 described above is repeated until the buffer memory becomes full (step S16).

The position and type (I, P, or B) of a picture recording on the recording medium can be recognized by referring to the picture-pointer file described with reference to FIG. 9. For example, when playback of a certain frame is instructed by a system or an upper-layer system the CPU 14 considers the frame that is to be played back according to the instruction as the target playback frame, and searches for a picture-pointer file considering the GOP to which the target playback frame belongs as a current GOP, thereby obtaining the position of an I picture in the current GOP. As described earlier, the picture-pointer file includes a picture type, a flag indicating whether the picture is the first picture in the GOP, picture-size information, and a beginning address. Thus, it is possible to search for a desired picture on the recording medium on the basis of these pieces of information.

When the target frame-buffer pattern has been determined on the basis of the target playback frame and the frame buffer has been filled with frames decoded in accordance with the target frame-buffer pattern, through the operation described with reference to FIG. 11, according to the playback instruction, playback within the normal speed in the forward direction and the reverse direction is carried out with a constant delay.

Although the above description has been given in the context of an example where the target playback frame is a frame based on a B picture, the process described with reference to the flowchart shown in FIG. 12 can be applied similarly to cases where the current frame is a frame based on an I picture or a P picture.

Figure 12:
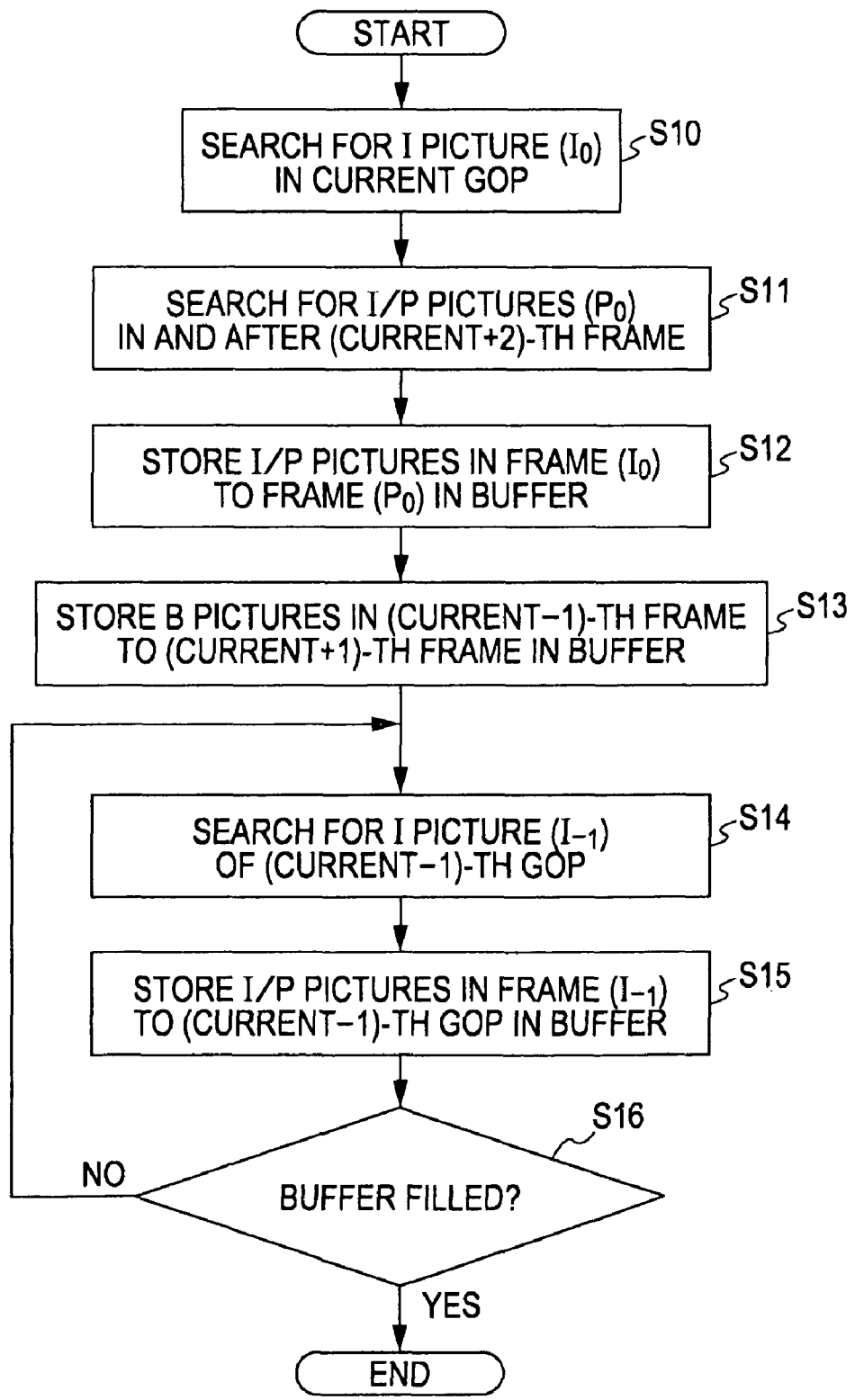
FIG. 12 is a flowchart showing an example of creation of a target frame-buffer pattern.

The process of generating a target frame-buffer pattern for a target playback frame that is to be played back according to an instruction from a system or an upper-layer system, according to the flowchart shown in FIG. 12, is executed, for example, each time a target playback frame is instructed. Alternatively, target frame-buffer patterns may be generated for all the frames in the GOP on the basis of the first instruction of a target playback frame. The target frame-buffer patterns that have been generated are stored, for example, in the RAM 36.

Without limitation to what has been described above, when the configuration of GOPs of a clip that is to be played back is known in advance, the process according to the flowchart shown in FIG. 12 may be executed on each picture in the GOP to generate in advance a frame-buffer updating pattern, such as the one shown in FIG. 11. Also, when the configuration of GOPs supported by the playback apparatus 1 is defined in advance, it is possible to generate an updating pattern in advance and to store the updating pattern in the ROM 35.

In response to an instruction to the operating unit 15 for playback within the normal speed in the forward direction or the normal speed in the reverse direction, the CPU 14 instructs a picture that is to be read from the optical disc 10 at each frame timing by referring to an updating pattern associated with an output frame, and updates the frame buffer.

Figure 15:
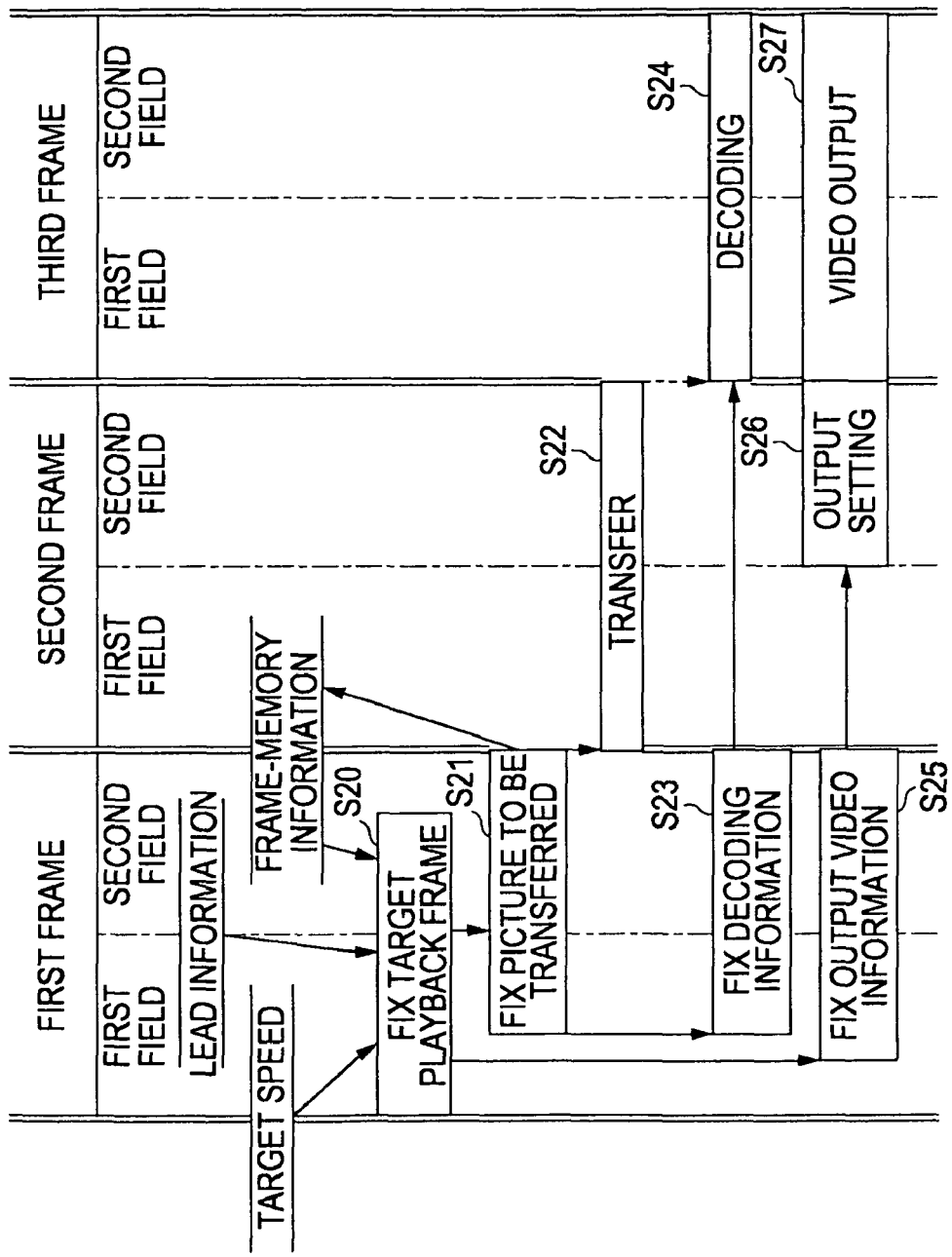
FIG. 15 is a diagram schematically showing synchronization control in the embodiment of the present invention.
Figure 16A:
FIGS. 16A to 16C are diagrams for explaining decoding of a long GOP.
Figure 16B:
Figure 16C:
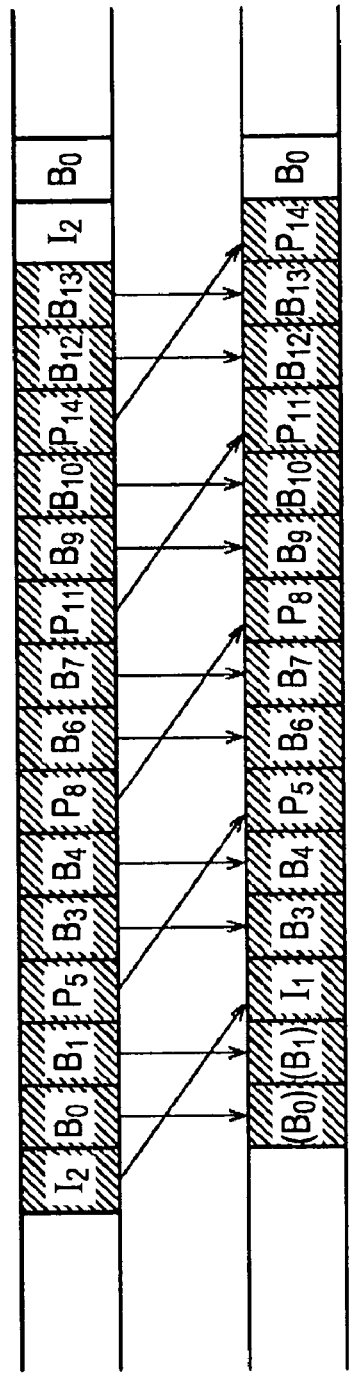

Next, a playback controlling operation based on the frame-buffer updating pattern will be described. Playback is controlled to achieve synchronization at the frame timing of each frame. FIG. 15 schematically shows an example of synchronization control in the embodiment of the present invention. In the example shown in FIG. 15, video data of each frame is decoded by cycles of three frames, and video data of each frame on the frame buffer is output in synchronization with the decoding.

At the first frame, in step S20, a target playback frame is determined on the basis of frame-buffer information obtained from the CPU 14, representing information of frames currently stored in the frame buffer, lead information of the disc drive 11, and target-speed information. The lead information is information regarding pictures stored in the cache memory 12 of the disc drive 11, and has already been read from the optical disc 10. The target-speed information is information representing a playback speed and direction, supplied to the CPU 14 by an operation of the operating unit 15 or a command from an upper-layer application or the like.

When the target playback frame has been determined, in step S21, a picture that is to be transferred to the decoder 22 is determined. That is, a picture that is to be decoded in relation to the determination of the target playback frame is determined on the basis of the frame-buffer updating pattern described with reference to FIG. 11.

For example, in the example on the 4th row of FIG. 11, when the playback direction is the forward direction, in relation to the frame "P6" as the current target playback frame, the frame "B7" or the frame "P6" is determined as a new target playback frame. Whether the frame "B7" or the frame "P6" is determined as a new target playback frame is determined unambiguously on the basis of the target-speed information, timing of the instruction, etc. In the following description, it is assumed that the frame "B7" is determined as a new target playback frame.

Furthermore, the frame-buffer information on the 4th row is compared with the frame-buffer information associated with the new target playback frame as the target playback frame, thereby extracting a frame that is to be newly decoded and a frame that is no longer used. In this example, the new target playback frame is the frame "B7". By comparing the frame-buffer information on the 4th row with the frame-buffer information on the 5th row, it is understood that the frame "B5" is no longer used and that the frame "B8" is to be decoded.

When a picture that is to be transferred has been determined in step S21, in step S22, the picture is transferred to the decoder 22 at the timing of the second frame. For example, the CPU 14 requests the disc drive 11 to read from the optical disc 10 the picture that is to be transferred. In response to the request, the disc drive 11 reads the picture (the picture corresponding to the frame "B8" in the above example) from the optical disc 10. The picture that has been read is transferred to the decoder 22. When other frames will be used to decode the picture, the frames to be used are read from the frame buffer and transferred to the decoder 22.

In this example, in which the frame "B8" is decoded, the picture corresponding to the frame "B8", and other frames "P6" and "P9" for decoding the frame "B8" are transferred to the decoder 22.

The pictures to be transferred are actually transferred by access to the cache memory of the disc drive 11, through DMA (direct memory access) transfer from the cache memory 12 to the decoder 22 without the CPU 14 acting therebetween.

In step S22, the pictures are transferred from the disc drive 11 to the decoder 22 in synchronization with the timing of the second frame. Furthermore, in step S23, in accordance with the determination of a picture to be transferred in step S21, decoding information for the picture is determined. For example, parameters used for decoding, extracted from the header information of the transferred picture, and information regarding other frames used for decoding are determined as decoding information. The decoding information that has been determined is passed to the decoder 22.

In step S24, on the basis of the decoding information transferred in step S23, the decoder 22 starts decoding of the picture transferred in step S22, in synchronization with the timing of the third frame. The decoded picture (frame) is written to a specific bank of the frame buffer, whereby the frame buffer is updated. In the example on the 4th row in FIG. 11, data of the decoded frame "B8" is overwritten to the bank where the frame "B5" has been written on the buffer memory (refer to the 5th row in FIG. 11).

When the target playback frame has been determined in step S20 described earlier, in step S25, information of output video data is determined. In the example on the 4th row in FIG. 11, the frame "P6" is determined as output video data. The information of output video data that has been determined is passed to the output-data controller 23. In step S26, the output-data controller 23 executes setting of video output on the basis of the information passed thereto, by the timing of the start of the third frame. Then, in step S27, on the basis of the setting, the frame "P6" is output in synchronization with the third frame.

Playback within the normal speed in the forward direction is allowed, for example, by controlling whether to shift the target playback frame to a next frame according to the playback-speed information supplied from an upper-layer application or the like in step S20 described earlier. For example, in the case of playback at a ½ speed in the forward direction, frames that are output are updated at a rate of one frame per two frame timings. This is allowed, for example, by updating the target playback frame at a rate of once per two frames. Unless the target playback frame is updated, processing is executed on the basis of the same frame-buffer pattern as in the immediately preceding iteration of processing, so that the same frame is output as the immediately preceding frame timing. At this time, preferably, an operation for accessing the optical disc 10 by the playback apparatus 1, a decoding operation by the decoder 22, etc. are stopped.

Although processing executed in the case of the forward playback direction has been described above, processing is executed similarly in the case of the reverse playback direction. At the first frame, in step S20, the target playback frame is determined on the basis of the frame-buffer information, the lead information, and the target-speed information. When the target playback frame has been determined, in step S21, a picture that is to be transferred to the decoder 22 is determined. In the example on the 4th row in FIG. 11, since the playback direction is the reverse direction, the frame "B5" or the frame "P6" is determined as the target playback frame. It is assumed herein that the frame "B5" is determined as the target playback frame. Furthermore, the frame-buffer information on the 4th row is compared with the frame-buffer information on the 3rd row, in which the output frame is the target playback frame, whereby it is understood that the frame "B7" is no longer used and that the frame "B4" is to be decoded.

When a picture that is to be transferred has been determined in step S21, in step S22, the picture is transferred to the decoder 22 at the timing of the second frame. At this time, when other pictures will be used to decode the picture, the pictures to be used are also read from the frame buffer and transferred to the decoder 22. In this example, in which the frame "B4" is decoded, the frames "I3" and "P6" used to decode the frame "B4" are also transferred to the decoder 22. The frames "I3" and "P6" already exist on the frame buffer, as shown on the 4th row in FIG. 11.

In step S23, in accordance with the determination of a picture to be transferred in step S21, decoding information for the picture is determined. The decoding information that has been determined is passed to the decoder 22. In step S24, on the basis of the decoding information transferred in step S23, the decoder 22 starts decoding of the picture transferred in step S22, in synchronization with the timing of the third frame. The decoded picture (frame) is written to a specific bank of the frame buffer, whereby the frame buffer is updated. In the example on the 4th row in FIG. 11, data of the decoded frame "B4" is overwritten to the bank where the frame "B7" has been written on the buffer memory (refer to the 3rd row in FIG. 11).

When the target playback frame has been determined in step S20 described earlier, in step S25, information of output video data is determined. In the example on the 4th row in FIG. 11, the frame "P6" is determined as output video data. The information of output video data that has been determined is passed to the output-data controller 23. In step S26, the output-data controller 23 executes setting of video output on the basis of the information passed thereto, by the timing of the start of the third frame. Then, in step S27, on the basis of the setting, the frame "P6" is output in synchronization with the third frame.

Regardless of whether the playback direction is the forward direction or the reverse direction, the processing in steps S20 to S27 described above is executed at each frame timing. For example, a target playback frame is determined in step S20 in synchronization with the first frame. Then, with the target playback frame as a new output frame, a process of determining a new target playback frame associated with the new output frame is started in synchronization with the second frame.

The new target playback frame is transferred from the disc drive 11 to the decoder 22 in synchronization with the third frame, so that the transfer does not interfere with the previous processing. Similarly, the decoding by the decoder 22 is executed in synchronization with the fourth frame (not shown), so that the decoding does not interfere with the previous processing.

As described above, according to the embodiment of the present invention, in variable-speed playback in a range of the normal-speed playback in the forward direction to the normal-speed playback in the reverse direction, using a normal-speed decoder, it is possible to produce a playback output without frame dropping and with a constant delay in response to a command instructing a playback speed and playback direction.

In the sequence described above with reference to FIG. 15, regarding, the period between the determination of a target playback frame in step S20 to video output of the target playback frame in step S27 with a constant delay, each of the data transfer in step S22 and the decoding in step S24 should be executed within 1 picture/frame period on average. That is, as long as each of the data transfer in step S22 and the decoding in step S24 is executed within 1 picture/frame period on average, the processing time of each of the data transfer and the decoding need not be fixed to a frame period.

When a normal-speed decoder is used for picture decoding, and playback within the normal speed in the forward direction and the reverse direction is achieved with a constant delay through the control based on the target frame-buffer pattern as described above, one frame is decoded each time the target playback frame is shifted, and one frame on the buffer memory is discarded. Thus, each of the data transfer in step S22 and the decoding in step S24 tends to converge to processing during 1 picture/frame period, so that the processing as a whole converges to processing at a cycle of three frames as shown in FIG. 15.

As described above, according to the embodiment of the present invention, in variable-speed playback in a range of the normal-speed playback in the forward direction to the normal-speed playback in the reverse direction, using a normal-speed decoder, it is possible to produce a playback output without frame dropping and with a constant delay in response to a command instructing a playback speed and playback direction.

In the embodiment described above, an optical disc is used as a recording medium, and clips are recorded in the form of an annulus structure. However, the present invention is not limited to the embodiment. For example, the recording format on the recording medium is not limited to an annulus structure, and may be other format. Also, the recording medium is not limited to an optical disc, and may be a hard disc drive or a semiconductor memory. Furthermore, although data is played back from a recording medium in the embodiment described above, without limitation to the embodiment, the present invention can be applied to a decoder that decodes stream data supplied from outside under a situation where streams can be supplied stably.

Furthermore, although the playback apparatus 1 is special hardware for playing back video data recorded on the optical disc 10 in the embodiment described above, without limitation to the embodiment, for example, a general-purpose computer (not shown), such as a personal computer, may be used as the playback apparatus 1. In this case, the functions of the playback apparatus 1 are achieved by programs installed on the computer. Furthermore, in this case, decoding of video data may be executed in software by the CPU, or special hardware may be provided in the computer.

It should be understood by those skilled in the art that various modifications, combinations, sub-combinations and alterations may occur depending on design requirements and other factors insofar as they are within the scope of the appended claims or the equivalents thereof.

What is claimed is:

1. A playback apparatus that is capable of playing back video data at a variable speed ranging from a normal speed in a reverse direction to a normal speed in a forward direction, the video data having been encoded for compression through inter-frame compression based on predictive coding and recorded on a recording medium that allows random access, the playback apparatus comprising:
a frame buffer configured to temporarily store video data of a plurality of frames;
a target-pattern generator configured to generate a target pattern of the frame buffer for a target playback frame that is to be played back next;
a comparator configured to compare a current state of the frame buffer with the target pattern; and
a frame-buffer controller configured to extract a frame that is to be newly decoded and to extract a frame that is no longer used in the current state of the frame buffer, on the basis of a result of the comparison by the comparator.

2. The playback apparatus according to claim 1, further comprising:
a decoding controller configured to exercise control to start input of the frame that is to be newly decoded, the frame having been extracted by the frame-buffer controller, and to decode the frame started to be input and store the decoded frame in an area of the frame that is no longer used in the frame buffer; and
an output controller configured to set an output frame from among the plurality of frames stored in the frame buffer.

3. The playback apparatus according to claim 1, wherein the target pattern at least includes the target playback frame, two frames temporally adjacent to the target playback frame, and frames that are used to further continue playback for one frame in each of respective directions of the two frames adjacent to the target playback frame.

4. The playback apparatus according to claim 1, wherein the target pattern is sequentially generated for each frame and stored on a storage medium as the video data is played back.

5. The playback apparatus according to claim 1, wherein the target pattern is generated in advance and stored on a storage medium.

6. A playback method for playing back video data at a variable speed ranging from a normal speed in a reverse direction to a normal speed in a forward direction, the video data having been encoded for compression through inter-frame compression based on predictive coding and recorded on a recording medium that allows random access, the playback method comprising the steps of:
generating a target pattern of a frame buffer that is capable of temporarily storing video data of a plurality of frames, the target pattern being associated with a target playback frame that is to be played back next;
comparing a current state of the frame buffer with the target pattern; and
extracting a frame that is to be newly decoded and extracting a frame that is no longer used in the current state of the frame buffer, on the basis of a result of the comparison.

7. A non-transitory computer readable medium storing a playback program for allowing a computer to execute a playback method for playing back video data at a variable speed ranging from a normal speed in a reverse direction to a normal speed in a forward direction, the video data having been encoded for compression through inter-frame compression based on predictive coding and recorded on a recording medium that allows random access, the playback method comprising the steps of:
generating a target pattern of a frame buffer that is capable of temporarily storing video data of a plurality of frames, the target pattern being associated with a target playback frame that is to be played back next;
comparing a current state of the frame buffer with the target pattern; and
extracting a frame that is to be newly decoded and extracting a frame that is no longer used in the current state of the frame buffer, on the basis of a result of the comparison.

* * * * *